US012289505B2

(12) United States Patent
Wahl et al.

(10) Patent No.: US 12,289,505 B2
(45) Date of Patent: *Apr. 29, 2025

(54) CROWD-SOURCED PROGRAM BOUNDARIES

(71) Applicant: Comcast Cable Communications, LLC, Philadelphia, PA (US)

(72) Inventors: David S. Wahl, Mullica Hill, NJ (US); Ehsan Younessian, Washington, DC (US); Jan Neumann, Arlington, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/348,439

(22) Filed: Jul. 7, 2023

(65) Prior Publication Data
US 2023/0353840 A1 Nov. 2, 2023

Related U.S. Application Data

(63) Continuation of application No. 17/545,600, filed on Dec. 8, 2021, now Pat. No. 11,750,895, which is a
(Continued)

(51) Int. Cl.
H04N 21/81 (2011.01)
H04N 21/234 (2011.01)
H04N 21/25 (2011.01)
H04N 21/2668 (2011.01)
H04N 21/442 (2011.01)
H04N 21/488 (2011.01)
H04N 21/845 (2011.01)

(52) U.S. Cl.
CPC ..... *H04N 21/812* (2013.01); *H04N 21/23424* (2013.01); *H04N 21/252* (2013.01); *H04N 21/2668* (2013.01); *H04N 21/44204* (2013.01); *H04N 21/4882* (2013.01); *H04N 21/8456* (2013.01)

(58) Field of Classification Search
CPC .................................................. H04N 21/20–80
See application file for complete search history.

(56) References Cited

U.S. PATENT DOCUMENTS 6,819,863 B2 11/2004 Dagtas et al.
7,370,073 B2 5/2008 Yen et al.
(Continued)

FOREIGN PATENT DOCUMENTS

WO 2008131247 A1 10/2008

OTHER PUBLICATIONS

Jun. 21, 2017—European Search Report—EP 17158411.3.
Oct. 4, 2018—European Office Action—EP 17158411.3.

*Primary Examiner* — Mushfikh I Alam
(74) *Attorney, Agent, or Firm* — Banner & Witcoff, Ltd.

(57) ABSTRACT

Systems, apparatuses, and methods are described for determining boundaries within a content asset. A server may collect user interaction data for one or more content assets. Using the user interaction data, the server may determine commercial breaks or scene changes for the content asset. The server may apply best fit curves to the user interaction data, and determine commercial breaks or scene changes based on the best fit curves.

34 Claims, 14 Drawing Sheets

Related U.S. Application Data continuation of application No. 15/885,923, filed on Feb. 1, 2018, now Pat. No. 11,228,817, which is a continuation-in-part of application No. 15/057,824, filed on Mar. 1, 2016.

(60) Provisional application No. 62/453,189, filed on Feb. 1, 2017.

(56) References Cited

U.S. PATENT DOCUMENTS

| | | | |
|---|---|---|---|
| 7,634,785 B2 | 12/2009 | Smith | |
| 7,962,929 B1 | 6/2011 | Oddo et al. | |
| 7,979,544 B2 | 7/2011 | Cancel et al. | |
| 8,019,162 B2 | 9/2011 | Zhang et al. | |
| 8,107,643 B2 | 1/2012 | Oh et al. | |
| 8,140,390 B2 | 3/2012 | Cansler et al. | |
| 8,209,713 B1* | 6/2012 | Lai | H04N 21/4383 725/18 |
| 8,533,760 B1* | 9/2013 | Lakin | H04N 21/6125 348/388.1 |
| 8,612,450 B1 | 12/2013 | Proffit et al. | |
| 8,625,607 B2 | 1/2014 | Rieger et al. | |
| 8,811,673 B1 | 8/2014 | Fleites et al. | |
| 9,055,254 B2 | 6/2015 | Selim | |
| 9,094,641 B1 | 7/2015 | Ansley | |
| 9,147,112 B2 | 9/2015 | Lienhart et al. | |
| 9,319,856 B1 | 4/2016 | Riggs | |
| 9,380,252 B2 | 6/2016 | Slothouber et al. | |
| 9,396,258 B2 | 7/2016 | Chu et al. | |
| 9,578,362 B1* | 2/2017 | Li | G06N 3/08 |
| 9,639,634 B1* | 5/2017 | Greene | G06F 16/4387 |
| 9,760,631 B1 | 9/2017 | Broxton et al. | |
| 11,418,833 B2* | 8/2022 | Ransom | H04N 21/2387 |
| 2002/0095676 A1* | 7/2002 | Knee | H04N 21/812 725/35 |
| 2002/0138831 A1 | 9/2002 | Wachtfogel et al. | |
| 2004/0034874 A1 | 2/2004 | Hord et al. | |
| 2005/0132419 A1 | 6/2005 | Gray et al. | |
| 2005/0207622 A1 | 9/2005 | Haupt et al. | |
| 2006/0041902 A1 | 2/2006 | Zigmond | |
| 2006/0222321 A1 | 10/2006 | Russ | |
| 2006/0277569 A1* | 12/2006 | Smith | G11B 27/036 725/35 |
| 2007/0107025 A1* | 5/2007 | Li | H04L 12/1854 725/100 |
| 2007/0136753 A1 | 6/2007 | Bovenschulte et al. | |
| 2007/0169148 A1 | 7/2007 | Oddo et al. | |
| 2007/0199040 A1 | 8/2007 | Kates | |
| 2007/0271580 A1 | 11/2007 | Tischer et al. | |
| 2008/0040740 A1 | 2/2008 | Plotnick et al. | |
| 2008/0127244 A1 | 5/2008 | Zhang | |
| 2008/0193017 A1 | 8/2008 | Wilson et al. | |
| 2008/0250447 A1 | 10/2008 | Rowe et al. | |
| 2009/0165043 A1* | 6/2009 | Ou | H04N 21/4383 725/38 |
| 2009/0187939 A1* | 7/2009 | Lajoie | H04N 7/17318 725/87 |
| 2010/0017814 A1 | 1/2010 | Archer | |
| 2010/0125875 A1 | 5/2010 | Hays et al. | |
| 2010/0158470 A1 | 6/2010 | Tzoukermann et al. | |
| 2010/0199299 A1 | 8/2010 | Chang et al. | |
| 2010/0211439 A1 | 8/2010 | Marci et al. | |
| 2010/0218231 A1 | 8/2010 | Frink et al. | |
| 2010/0287580 A1 | 11/2010 | Harding et al. | |
| 2010/0325657 A1 | 12/2010 | Sellers et al. | |
| 2011/0015989 A1 | 1/2011 | Tidwell et al. | |
| 2011/0061068 A1 | 3/2011 | Ali et al. | |
| 2011/0185437 A1 | 7/2011 | Tran et al. | |
| 2011/0289094 A1 | 11/2011 | Fisher | |
| 2011/0289533 A1 | 11/2011 | White et al. | |
| 2011/0307913 A1 | 12/2011 | Wang et al. | |
| 2012/0017239 A1* | 1/2012 | Ryu | H04N 21/44008 725/32 |
| 2012/0124606 A1 | 5/2012 | Tidwell et al. | |
| 2012/0147200 A1* | 6/2012 | Watanabe | H04N 23/63 348/207.11 |
| 2012/0191395 A1 | 7/2012 | Bandsmer | |
| 2012/0243850 A1 | 9/2012 | Basra et al. | |
| 2012/0250980 A1 | 10/2012 | Gillard et al. | |
| 2012/0304207 A1 | 11/2012 | Hughes et al. | |
| 2013/0091521 A1 | 4/2013 | Phillips et al. | |
| 2013/0139192 A1 | 5/2013 | Fontan et al. | |
| 2013/0205326 A1 | 8/2013 | Sinha et al. | |
| 2013/0227609 A1 | 8/2013 | Winter et al. | |
| 2013/0227611 A9 | 8/2013 | Grauch et al. | |
| 2013/0298159 A1* | 11/2013 | You | H04N 21/44213 725/34 |
| 2013/0305273 A1 | 11/2013 | Hadfield et al. | |
| 2013/0305279 A1* | 11/2013 | Candelore | H04N 21/812 725/32 |
| 2013/0305280 A1 | 11/2013 | Fleischman | |
| 2014/0033240 A1 | 1/2014 | Card, II | |
| 2014/0059163 A1 | 2/2014 | Herbrich et al. | |
| 2014/0059576 A1 | 2/2014 | Mule | |
| 2014/0068662 A1 | 3/2014 | Kumar | |
| 2014/0075463 A1 | 3/2014 | Kamdar | |
| 2014/0075464 A1* | 3/2014 | McCrea | G16H 40/67 709/206 |
| 2014/0089980 A1 | 3/2014 | Alexander et al. | |
| 2014/0101683 A1 | 4/2014 | Arshavski et al. | |
| 2014/0236530 A1 | 8/2014 | Greene et al. | |
| 2014/0282642 A1 | 9/2014 | Needham et al. | |
| 2014/0282693 A1* | 9/2014 | Soundararajan | H04N 21/812 725/32 |
| 2014/0282790 A1 | 9/2014 | Stephens et al. | |
| 2014/0321831 A1 | 10/2014 | Olsen et al. | |
| 2015/0139488 A1 | 5/2015 | Dharssi et al. | |
| 2015/0163527 A1* | 6/2015 | Caputo | H04N 7/16 725/95 |
| 2015/0201031 A1 | 7/2015 | James et al. | |
| 2015/0229979 A1 | 8/2015 | Wood et al. | |
| 2015/0332488 A1 | 11/2015 | Beck et al. | |
| 2015/0365736 A1 | 12/2015 | Xiong et al. | |
| 2016/0050465 A1 | 2/2016 | Zaheer et al. | |
| 2016/0088486 A1 | 3/2016 | Taher et al. | |
| 2016/0112773 A1 | 4/2016 | Zukerman et al. | |
| 2016/0134937 A1* | 5/2016 | Detty | H04N 21/44008 725/42 |
| 2016/0156978 A9 | 6/2016 | Aaron et al. | |
| 2016/0173942 A1 | 6/2016 | Ransom et al. | |
| 2016/0182922 A1 | 6/2016 | Fonseca, Jr. et al. | |
| 2016/0227259 A1 | 8/2016 | Brav et al. | |
| 2016/0309227 A1* | 10/2016 | Casagrande | H04N 21/4583 |
| 2016/0316233 A1 | 10/2016 | Ghadi et al. | |
| 2016/0323627 A1 | 11/2016 | Lievens et al. | |
| 2016/0337705 A1* | 11/2016 | Jones | H04N 21/234381 |
| 2016/0353139 A1* | 12/2016 | Smith | H04N 21/233 |
| 2016/0366458 A1 | 12/2016 | Whitman et al. | |
| 2017/0083947 A1 | 3/2017 | Feldman et al. | |
| 2017/0085933 A1 | 3/2017 | Czeck, Jr. et al. | |
| 2017/0094341 A1 | 3/2017 | Berner et al. | |
| 2017/0118526 A1* | 4/2017 | Tanji | H04N 21/812 |
| 2017/0220816 A1 | 8/2017 | Matusek et al. | |
| 2017/0243244 A1 | 8/2017 | Trabelsi et al. | |
| 2019/0163752 A1 | 5/2019 | Barlaskar et al. | |
| 2019/0349634 A1 | 11/2019 | Rasool | |
| 2020/0045354 A1 | 2/2020 | Gao et al. | |
| 2020/0213669 A1* | 7/2020 | Oztaskent | H04N 21/812 |
| 2021/0021885 A1* | 1/2021 | Smith | H04N 21/8456 |
| 2021/0058654 A1 | 2/2021 | Estus et al. | |
| 2022/0132179 A1 | 4/2022 | Bennett-James et al. | |
| 2022/0321940 A1 | 10/2022 | Christie et al. | |

\* cited by examiner

| Genre | Threshold | FF Weight | Content Switch Weight | Logo | Clock | Volume Change | Pause |
|---|---|---|---|---|---|---|---|
| SitCom | 50 | 1 | .8 | -5 | -0 | 10 | 5 |
| Action | 65 | .75 | .75 | -5 | -0 | 5 | 5 |
| Comedy | 65 | .8 | .6 | -5 | -0 | 10 | 5 |
| Drama | 55 | 1 | .9 | -5 | -0 | 5 | 5 |
| Sports | 70 | .7 | 1 | -5 | -15 | 5 | 0 |

FIG. 5

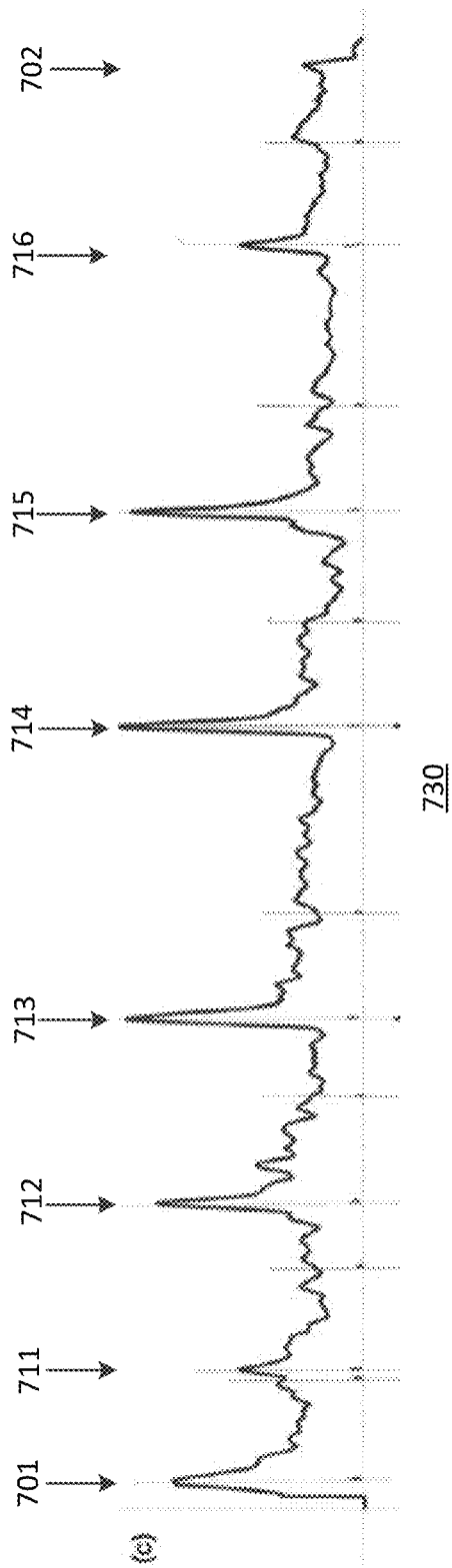
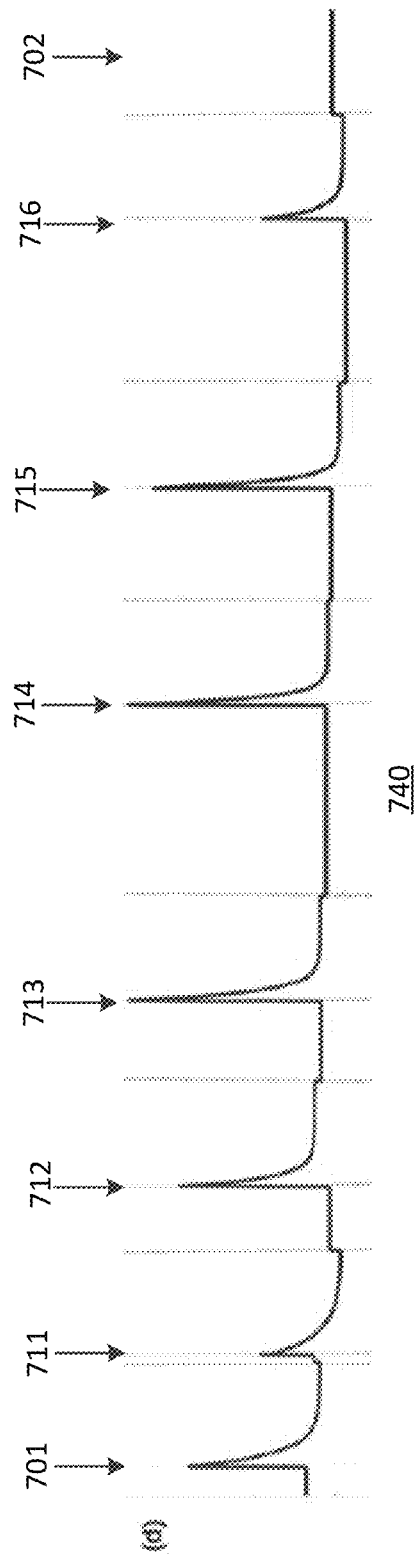
FIG. 7C
FIG. 7D

CROWD-SOURCED PROGRAM BOUNDARIES

CROSS-REFERENCE TO RELATED APPLICATION

This application is a continuation of and claims priority to U.S. patent application Ser. No. 17/545,600, filed Dec. 8, 2021, which is a continuation of U.S. patent application Ser. No. 15/885,923, filed Feb. 1, 2018 (now U.S. Pat. No. 11,228,817), which is a continuation-in-part of and claims priority to U.S. patent application Ser. No. 15/057,824, filed Mar. 1, 2016, and claims the benefit of U.S. Provisional Application No. 62/453,189, filed Feb. 1, 2017, each of which is hereby incorporated by reference in its entirety.

BACKGROUND

Commercial breaks are often included in content assets. Users often switch between content assets to avoid watching commercials, but such content switch may cause the user to miss parts of a show they were previously watching. To improve viewing experiences, new features surrounding commercial breaks, for example, identifying when the commercial breaks begin and end, may be developed.

SUMMARY

The following summary presents a simplified summary of certain features. The summary is not an extensive overview and is not intended to identify key or critical elements.

Systems, apparatuses, and methods are described for determining commercial break start times and commercial break end times based on user interactions. Users may switch away from a content asset if presented with a commercial break. By analyzing content switch data associated with the content asset, a server may accurately depict points at which commercial breaks begin and end.

A content asset may enter a commercial break, and the user watching the content asset may tune away to a different content asset. The user may wish to be alerted if the content asset returns from the commercial break. A server may receive content switch commands from the user and other users. The server may generate data for the content asset indicating the content switch commands over the duration of the content asset. Using the data, the server may determine commercial break start times. The server may apply best fit curves to the data. Based on the best fit curves, the server may determine a commercial break end time. The server may alert the user if the content asset reaches the commercial break end time. Additionally or alternatively, the server may predict commercial break start times and end times using previous content switch information, such as content switch information for a previous commercial break of the content asset.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5 shows example rule data for a content item.

FIGS. 7A-D show examples of user content switch interactions over a duration of a content asset.

DETAILED DESCRIPTION

Figure 1:
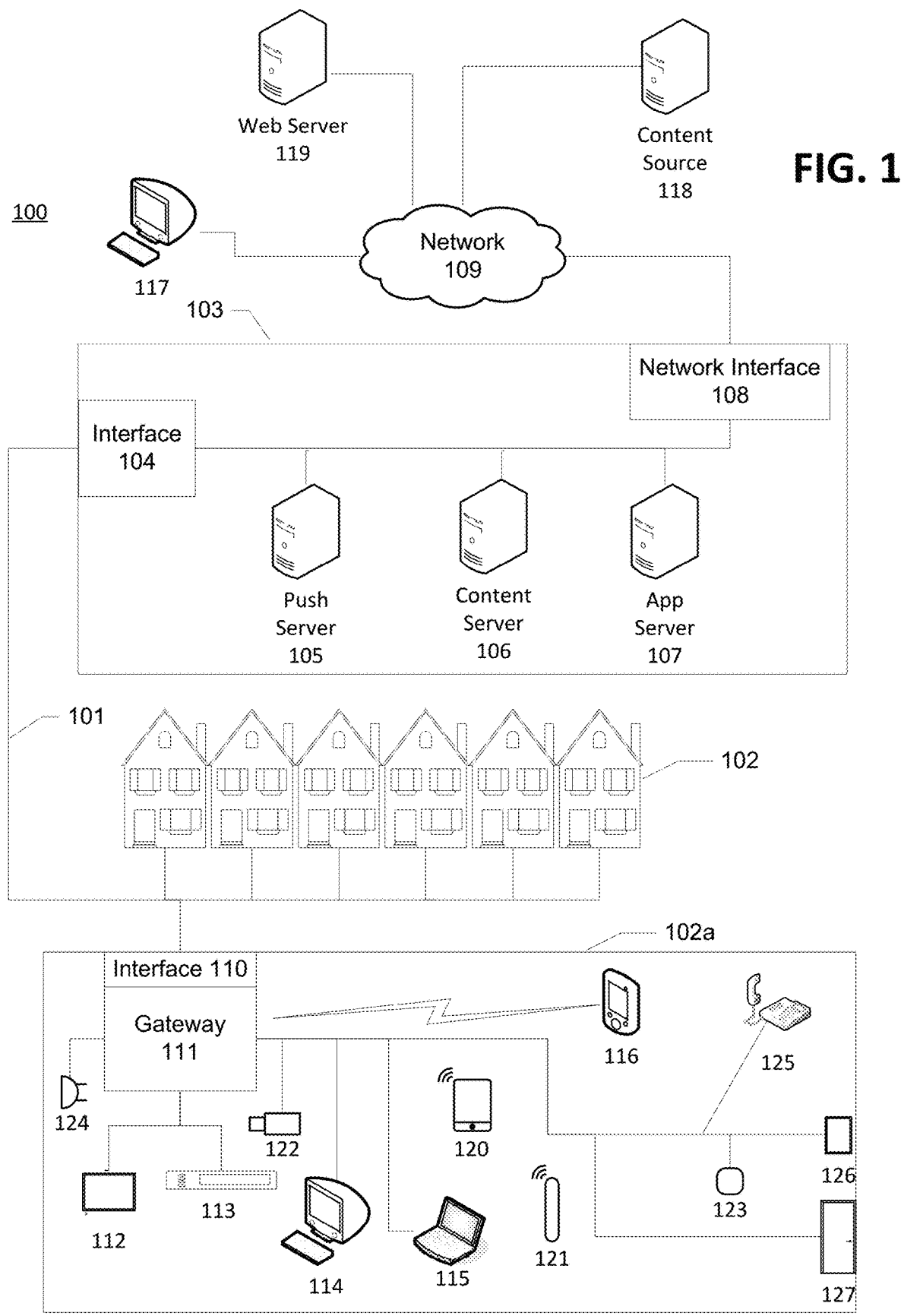
FIG. 1 shows an example information distribution network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example information distribution network 100 in which features described herein may be implemented. The information distribution network 100 may be any type of information distribution network, such as satellite, telephone, cellular, wireless, etc. One example may be a wireless network, an optical fiber network, a coaxial cable network, or a hybrid fiber/coax (HFC) distribution network. Such networks use a series of interconnected communication links 101 (e.g., coaxial cables, optical fibers, wireless, etc.) to connect multiple premises 102 (e.g., businesses, homes, consumer dwellings, etc.) to a local office 103 (e.g., a headend, a processing facility, etc.). The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not shown, such as splitters, filters, amplifiers, etc. to help convey the signal clearly. Portions of the links 101 may also be implemented with fiber-optic cable, while other portions may be implemented with coaxial cable, other lines, or wireless communication paths.

The local office 103 may include an interface 104, such as a cable modem termination system (CMTS) in an example of an HFC-type network, which may be a computing device configured to manage communications between devices on the network of links 101 and backend devices such as servers 105-107 (to be discussed further below). In the example of an HFC-type network, the termination system (TS) may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by modems at the various premises 102, and to receive upstream communications from those modems on one or more upstream frequencies. The local office 103 may also include one or more network interfaces 108, which can permit the local office 103 to communicate with various other external networks 109. These networks 109 may include, for example, Internet Protocol (IP) networking devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network, its corresponding cell phones, web server 119, and/or content source 118.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users in homes. This content may be, for example, video on demand, television programs, songs, services, information, text listings, etc. The content server 106 may include software to validate (or initiate the validation of) user identities and entitlements, locate and retrieve (or initiate the locating and retrieval of) requested content, encrypt the content, and initiate delivery (e.g., streaming, transmitting via a series of content fragments) of the content to the requesting user and/or device. The content server 106 may also receive information regarding user interactions, such as data indicating user interactions of live or recorded content.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting content listings information and generating a data download for electronic program guide listings. Another application server may be responsible for monitoring user viewing habits and collecting that information for use in selecting advertisements. Another application server may be responsible for formatting and inserting advertisements in a video stream and/or content item being transmitted to the premises 102.

An example premises 102a may include an interface 110 (such as a modem, or another receiver and/or transmitter device suitable for a particular network), which may include transmitters and receivers used to communicate on the links 101 and with the local office 103. The interface 110 may be, for example, a coaxial cable modem (for coaxial cable lines 101), a fiber interface node (for fiber optic lines 101), or any other desired modem device. The interface 110 may be connected to, or be a part of, a gateway interface device 111. The gateway interface device 111 may be a computing device that communicates with the interface 110 to allow one or more other devices in the home to communicate with the local office 103 and other devices beyond the local office. The gateway 111 may be a set-top box (STB), digital video recorder (DVR), computer server, and/or any other desired computing device. The gateway 111 may also include (not shown) local network interfaces to provide communication signals to other devices in the home (e.g., user devices), such as televisions 112, additional STBs 113, personal computers 114, laptop computers 115, wireless devices 116 (wireless laptops, tablets and netbooks, mobile phones, mobile televisions, personal digital assistants (PDA), etc.), telephones 117, window security sensors 118, door home security sensors 119, tablet computers 120, personal activity sensors 121, video cameras 122, motion detectors 123, microphones 124, and/or any other desired computers, sensors, and/or other devices. Examples of the local network interfaces may include Multimedia Over Coax Alliance (MoCA) interfaces, Ethernet interfaces, universal serial bus (USB) interfaces, wireless interfaces (e.g., IEEE 802.11), Bluetooth interfaces, and/or others.

As used herein, if one computing device instructs a different computing device to perform one or more operations, the computing device may send one or more instructions with one or more parameters for the operations to the different computing device, which may execute the one or more instructions with the one or more parameters to perform the instructed operations.

Figure 2:
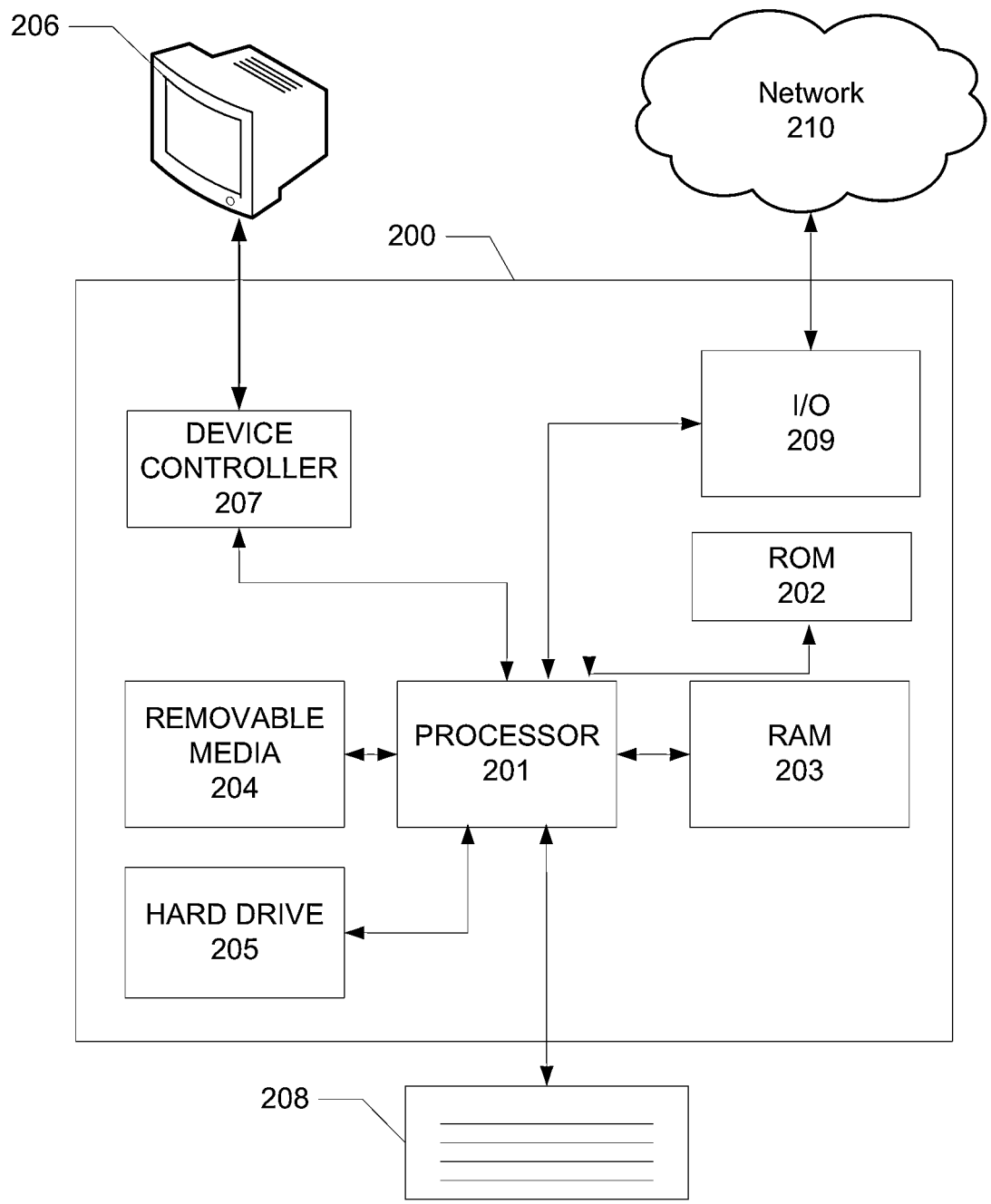
FIG. 2 shows general hardware elements of an example computing device.

FIG. 2 shows general hardware elements of an example computing device 200 that can be used to implement any of the elements discussed herein and/or shown in the figures. The computing device 200 may include one or more processors 201, which may execute instructions of a computer program to perform any of the features described herein. The instructions to configure the operation of the processor 201 may be stored in any type of computer-readable medium or memory. For example, instructions may be stored in a read-only memory (ROM) 202, a random access memory (RAM) 203, a removable media 204, such as a Universal Serial Bus (USB) drive, compact disk (CD) or digital versatile disk (DVD), floppy disk drive, and/or any other desired electronic storage medium. Instructions may also be stored in an attached (or internal) storage 205 (e.g., hard drive, flash, etc.). The computing device 200 may include one or more output devices, such as a display 206 (or an external television), and may include one or more output device controllers 207, such as a video processor. There may also be one or more user input devices 208, such as a remote control, keyboard, mouse, touch screen, microphone, camera, etc. The computing device 200 may also include one or more network interfaces such as an interface 209 (such as a network card), to communicate with a network 210. The network interface may be a wired interface, wireless interface, or a combination of the two. The interface 209 may include a modem (e.g., a cable modem), and the network 210 may include the communication links 101 discussed above; the external network 109; an in-home network; a provider's wireless, coaxial, fiber, or hybrid fiber/coaxial distribution system (e.g., a DOCSIS network); and/or any other desired network.

The FIG. 2 example is an example hardware configuration. Modifications may be made to add, remove, combine, divide, or otherwise alter the components as desired. Additionally, the components shown may be implemented using basic computing devices and components, and the same components (e.g., processor 201, ROM 202, etc.) may be used to implement any of the other computing devices and components described herein. For example, the various components herein may be implemented using computing devices having components such as a processor executing computer-executable instructions stored on a computer-readable medium, as shown in FIG. 2.

One or more features of the disclosure may be implemented in computer-usable data and/or computer-executable instructions, such as in one or more program modules, and executed by one or more computers (such as computing device 200) or other devices to perform any of the functions described herein. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. In addition, the functionality may be implemented in whole or in part in firmware or hardware equivalents such as integrated circuits, field programmable gate arrays (FPGA), and the like.

Figure 3:
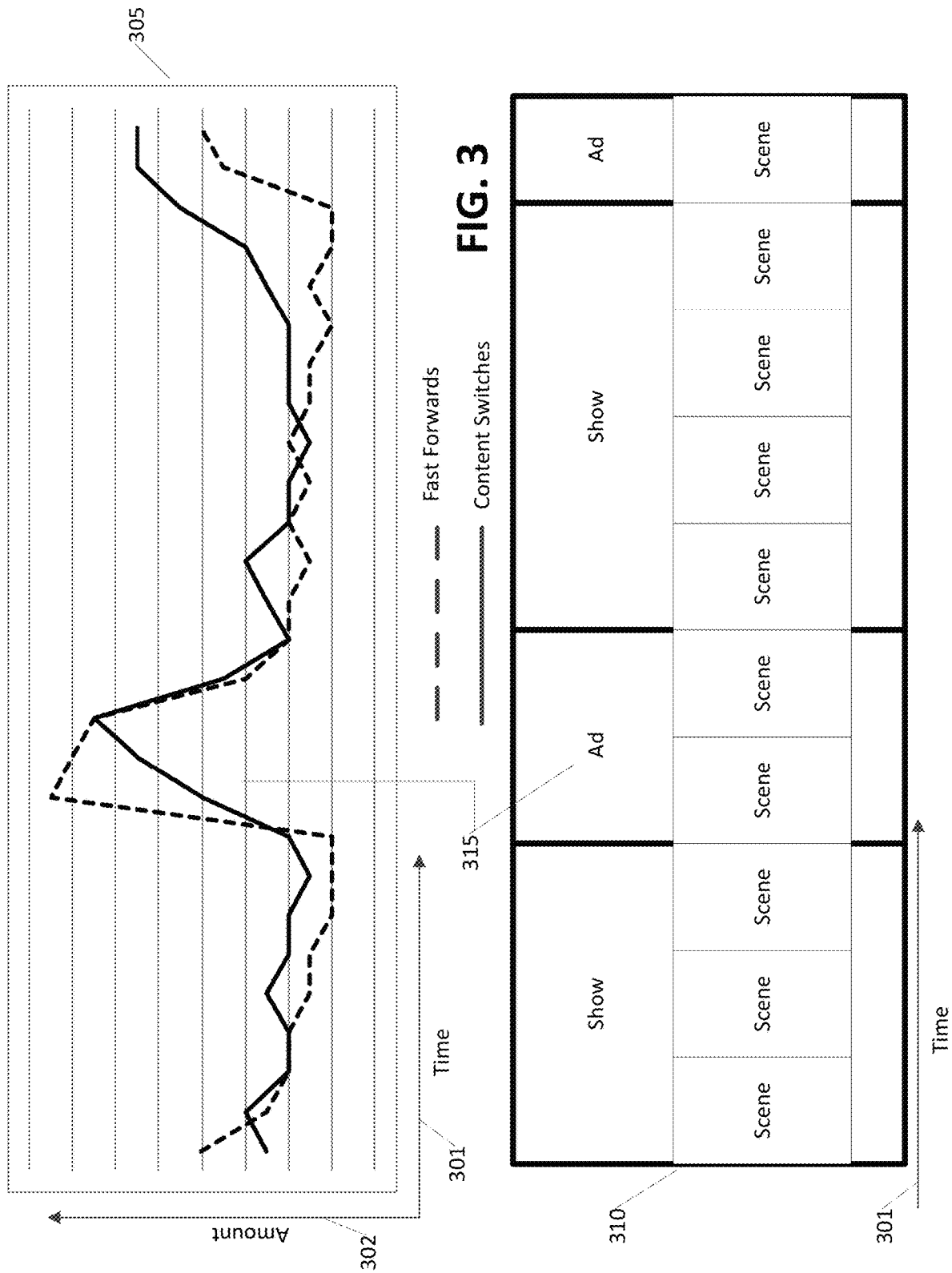
FIG. 3 shows an example of user interactions corresponding to a content item.
Figure 6:
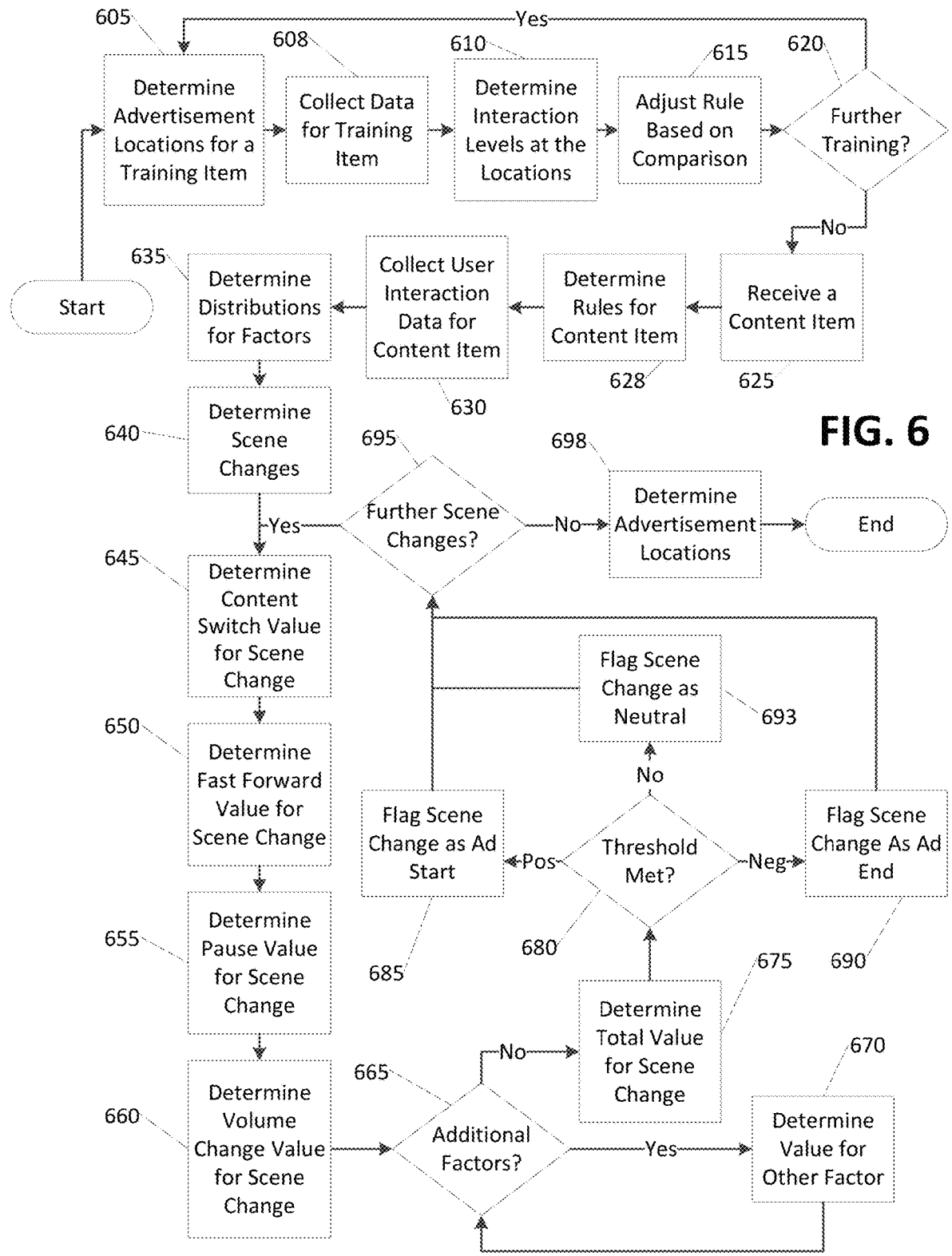
FIG. 6 shows an example method for determining the location of advertisements based on user interactions.

FIG. 3 shows an example of user interactions corresponding to a content item. Graph 305 represents an amount 302 of how many users are fast forwarding or switching to and away from a content item at given points in time 301 aligned in time 301 with a content item 310. A content item may be any type of content, such as a situational comedy (sitcom), action program, comedy program, drama program, and/or a sporting event, and may be transmitted in any suitable or desirable manner. The content item may also have one or more advertisements (e.g., commercials) interspersed throughout the content item, e.g., between different parts of a show. The content item 310 may be organized into one or more scenes. The scenes may be determined by analyzing the content of the media item to determine content that goes together. For example, a show may contain multiple scenes set in different rooms. Using visual analysis, a system may determine that certain frames of a given show share visual characteristics, and group the similar frames into a scene. Further, at the first commercial break, the visual content may change at the transition to a commercial, indicating a different scene. Thus, some scenes may correspond to an advertisement. Transitions between scenes (scene changes) may present points at which advertisements may likely begin or end. Analyzing scenes and scene changes may help identify which scene changes correspond to scene transitions within a show, and which scene changes correspond to scene transitions into, out of, and between advertisements. For example, data representing times at which scene changes occur may be used by a system such as depicted in FIG. 6 in order to assist in establishing when advertisements begin or end.

User interactions may correspond to the scene changes between the show and the advertisements. For example, the user interactions may temporally coincide with the scene changes. For example, at point 315, the content item may transition from the show to the advertisements. If this occurs, many users may take some action to avoid watching the advertisements. For example, users may begin switching content (e.g., tuning out of or switching away from the transmission, changing from a channel corresponding to the transmission to another channel, or selecting different content). Also, many users watching the content via time-delay may fast forward the content to skip past the advertisements. This is reflected in the graph 305. When the content item transitions to the ad at point 315, many users who are watching the content live will switch to other content (such as by changing to another television station). Thus, those users enter a "content switch" state, and the number of users in the content switch state may continue to increase as more and more users switch content. As the advertisement period reaches its conclusion, users will begin to switch back (e.g., tune in) to the content in order to continue watching the show. While many users may switch back (e.g., tune back in) before the show has resumed, they may see that the content is still showing advertisements, and switch content again. In the aggregate, this may be reflected in a sharp decrease in content switch events only when the show has resumed or is about to resume.

Fast forwarding events may also demonstrate the boundaries of an advertisement in a content item. If a user watches time-delayed content, the user may begin fast forwarding if he or she encounters an advertisement. When the user notices that the advertisements have ceased and the show resumed, the user may cease fast forwarding. The increase and subsequent decrease may present a spike in fast forwarding events, such as that depicted at point 315.

Figure 4:
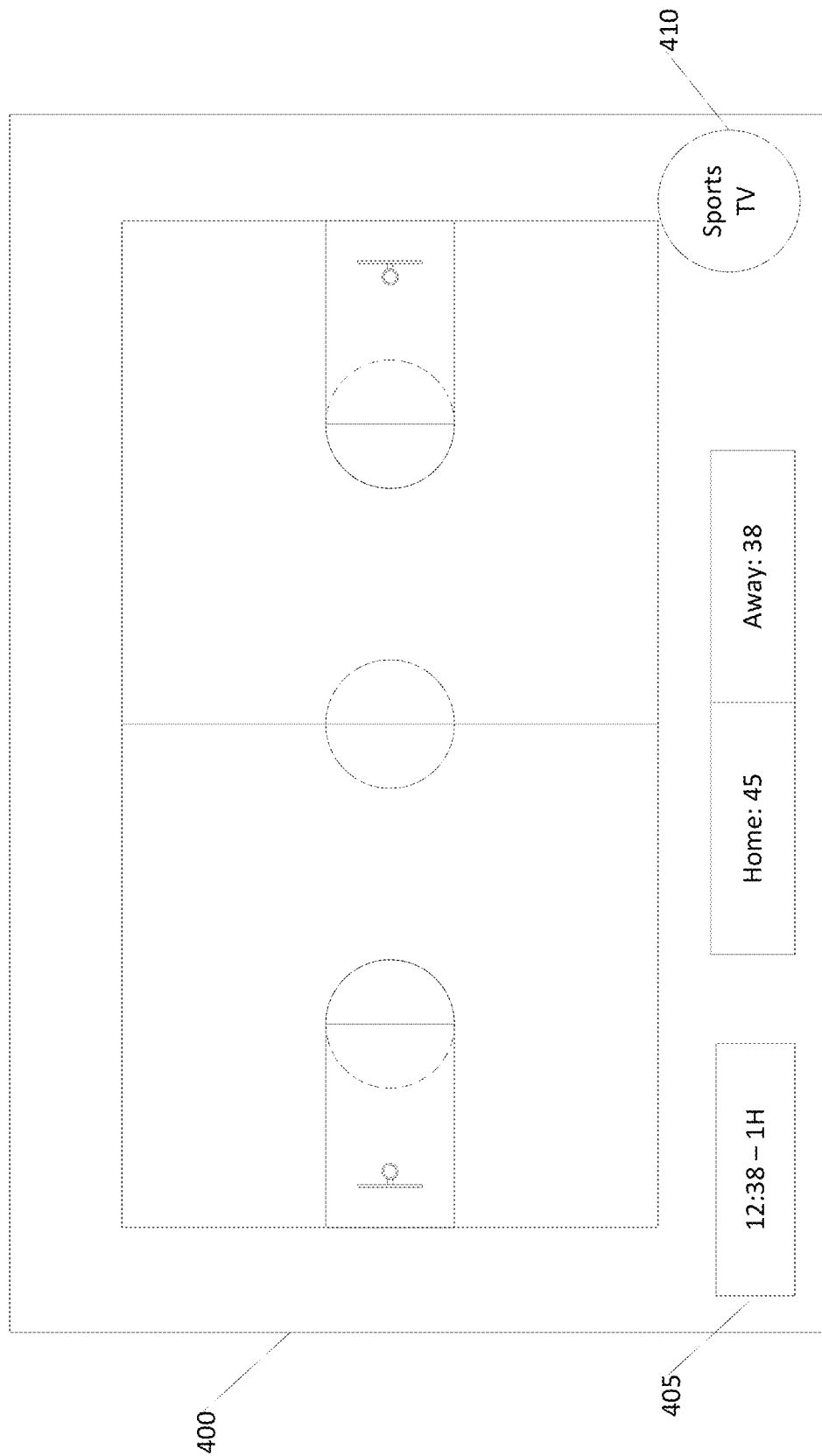
FIG. 4 shows an example screen depicting additional factors that may assist in determining whether a portion of content is an advertisement.

FIG. 4 shows an example screen depicting additional factors that may assist in determining whether a portion of content is an advertisement. By combining these additional factors with other factors discussed herein, a system may more accurately determine whether a scene is an advertisement. As one example, a scene 400 may depict a basketball game. The scene may also depict a game clock 405 and a logo 410.

The game clock 405 may indicate that the current scene is a show and not an advertisement. When the game is ongoing, the game clock may be displayed on a screen. When the content changes to an advertisement, the game clock may no longer be displayed. This may mean that there is a strong correlation between the presence of a game clock and whether the scene is of a show. The game clock may also provide contextual information to assist in making a determination of whether the scene is an advertisement. For example, a sporting event broadcast may typically go to a commercial break following a quarter or half. Thus, a transition from a clock winding down, such as one reading "0:00," to a scene change may be indicative of an advertisement.

Logic, rules, or parameters (e.g., clock detection logic, rules, or parameters), may be preloaded or learned. The system may be preconfigured to detect the presence of a game clock. For example, the system may be configured to detect the presence of a variety of known logos. Additionally or alternatively, image detection may be learned. The system may automatically detect that a shape and/or set of numbers appears on the screen, and determine that the shape is a logo and/or the set of numbers is a clock. For example, the system may detect a tree watermark in numerous scenes, and automatically determine that the tree watermark is a logo.

Genre information may assist in the determination of whether a scene relates to a particular portion of a content item, such as the primary content or an advertisement. Different genres may have different characteristics and user behaviors. For example, a game clock 405 may typically only be seen during a sporting event. If the content item is not a sporting event, then a system may reduce the value of the presence of a clock on screen, as it is less likely to be related to the show (for example, an advertisement may include a game clock or a countdown timer for a sale). Further, user behavior may differ based on the genre. For example, when watching a recorded sporting event, users may often fast forward through a portion of the event that is less interesting. Thus, fast forward events may have a lower correlation with the location of an advertisement. As another example, users may frequently switch away from and switch back to a sporting event due to commercial breaks. Thus, content switches may have a higher correlation with the location of an advertisement in sporting events.

Other on-screen information may indicate that a scene may or may not be an advertisement. A logo 410 may only be shown during a show and may be removed for most advertisements. The presence of the logo may thus indicate that the scene is more likely to be a show. Numerous other factors may be used, such as the presence of a phone number on screen or pricing information.

FIG. 5 shows example rule data for a content item. A rule 500 may comprise a number of different variables for use by the system in determining whether a scene is an advertisement. There may be a different variable for each genre 505. For example, users may be more likely to randomly switch away from a comedy program than a sports broadcast, so content switches may be weighted more heavily for a sports genre than a comedy genre. The weights may be configured by a user and/or configured by training the system with a content item (further discussion of training the system with a content item may be found in FIG. 6). The weights depicted in FIG. 5 are merely some examples of the way that weights may be configured, and they may vary based on the implementation and/or over time. Additionally or alternatively, the system may combine different weights using scalar and/or vector-valued weighting functions in determining whether a scene is an advertisement.

A threshold 510 may establish the total value needed to establish that a scene corresponds to an advertisement. User interactions may be more random, and so a lower correlation is needed. For example, users may tend to interact less with a drama program than an action program, so the threshold needed to determine an advertisement beginning or ending for a drama program may be lower than an action program. Further discussion of thresholds may be found in FIG. 6 and associated discussion.

A fast forward weight 515 may indicate the weights given to fast forwarding for different genres for calculating a total value to compare against the threshold 510. The weights may correspond to the likelihood that the fast forwarding corresponds to an advertisement. For example, users may be more likely to fast forward through a boring segment of an action show, but they may rarely fast forward through a segment of a drama. Rewinding may be used in place of or in addition to fast forwarding as described herein. Further discussion of fast forward values may be found in FIG. 6 and accompanying description.

A content switch weight 520 may indicate the weight given to content switches for different genres for calculating a total value to compare against the threshold 510. The weights may correspond to the likelihood that the content switches correspond to an advertisement. For example, users may frequently switch content at the beginning or end of a set of advertisements for a sporting event, but they may switch content randomly for a comedy. Further discussion of content switch values may be found in FIG. 6.

A logo weight 525 may indicate the weight given to logos for different genres for calculating a total value to compare against the threshold 510. A logo may be, for example, a simple indicator that a section is not an advertisement. Thus, the presence of a logo may reduce the total value that is compared against the threshold. Further discussion of logos may be found in FIG. 4 and FIG. 6.

A clock weight 530 may indicate the weight given to the presence of a clock for calculating a total value to compare against the threshold 510. A game clock may be, for example, a simple indicator that a section is not an advertisement. Thus, the presence of a game clock may reduce the total value that is compared against the threshold for content where a game clock is normally displayed (such as sporting events). Further discussion of game clocks may be found in FIG. 4 and FIG. 6.

A volume change weight 535 may indicate the weight given to volume change events for calculating a total value to compare against the threshold 510. The weights may correspond to the likelihood that the volume changing corresponds to an advertisement. For example, many users may turn down the volume when a show transitions into a commercial. Thus, a high number of commands to reduce the volume may indicate that advertisements have begun. Further, a high number of commands to increase the volume may indicate that advertisements have ended. Volume change commands may also vary per genre. For example, in genres such as sitcoms or comedies, users may rarely change volume in shows that have an even volume level, which may provide a stronger correlation between volume changes and advertisements. In genres where volume may increase or decrease suddenly as part of the show, such as an action movie, there may be a greater chance that the volume change is unrelated to an advertisement, and so the correlation may be lower. Further discussion of volume change values may be found in FIG. 6.

A pause weight 545 may indicate the weight given to pause events for calculating a total value to compare against the threshold 510. The weights may correspond to the likelihood that the pause events correspond to an advertisement. For example, a user may often pause prior to commercial breaks in most programs. However, a user may pause a live sporting event at any time—such as pausing so that he or she may go to the bathroom without missing a part of the game—so a pause during a sporting event may have a lower correlation compared to other pauses. Thus, a higher number of pause events may have a correlation with advertisements. Further discussion of pause values may be found in FIG. 6.

FIG. 6 shows an example method for determining the location of advertisements based on user interactions. Initial steps may be taken to train a system to optimize rules for determining the location of advertisements for a genre or type of media content. This training may be performed on and by the system, and/or it may be performed elsewhere and the relevant data be uploaded for use by the system. Thus, steps 605-620 may be performed independently or along with steps 625-698. At step 605, a system (such as a computing device 200) may determine advertisement locations for a training item, which may be based on known advertisement locations using metadata or human input. For example, a user may examine a sporting event and flag the beginning and end of every section of advertisements for the duration of the sporting event. The system may also determine what the content type may be for the training item. For example, metadata may flag the content item as a sporting event, or a user may manually flag the content item as a drama.

At step 608, the system may collect data for the training item. The data may comprise user interaction data and other data that may be used to determine whether a portion of a content item is an advertisement. The user interaction data may be data collected from one or more sources, such as a STB, a display device connected to a network such as an the Internet, etc., as would be collected for a content item in step 630. Using the collected data, the system may determine in step 610 what the levels are for the collected data corresponding to the locations of advertisements that were determined in step 605.

In step 610, the system may determine the correlation between interaction levels and the locations of advertisements in the training item. The system may compare different factors against the known beginning and end of the advertisements in order to determine which interactions to weight more or less heavily. The system may determine a content switch value for the beginning of advertisement sections using a method such as is described in step 645 and a fast forward value for the beginning of the advertisement sections using a method such as is described in step 650. For example, the system may determine that the beginning of the advertisement sections for the training item has a high content switch value of 30 but a low fast forward value of 10. Further, the system may determine that the end of the advertisements has a content switch value of −42, but a fast forward value of −3.

In step 615, the system may adjust one or more rules based on the comparison. The rule may be, for example, specific to a genre, a sub-genre, time of day, channel, and/or any other delineation applicable to the collected data and the training item. For example, the system may determine content switch and fast forward values for a train item as above. The training item may be a comedy (as flagged determined in step 605), and so the system may more heavily weight content switches for comedies relative to fast forwards, because the content switches were more indicative of the beginning and end of a section of advertisements.

In step 620, the system may determine whether further training is desired. The system may repeat steps 605-615 by using different content items, different genres, different interactions, and/or any other variation that may be useful. Steps 605-615 may also be repeated on other systems, and the resultant data shared. This may occur at any time, and may be independent of any other steps. Further training may have the advantage of establishing different rules delineated to particular types of content items, and may further have the advantage of refining those rules based on reiterating the training steps for each of the multiple types of content items and/or user interactions. Once training has concluded, the system may proceed to receiving a content item in step 625.

In step 625, the system may receive a content item for which the system is to determine the location of advertisements within the content item. Additionally or alternatively, the system may, without receiving the content item, access data needed to perform the required analysis, such as content identification and user interaction data. The system may determine one or more rules for the content item in step 628. The rules determined in step 628 may be determined based on the genre of the content item, the sub-genre of the content item, the time of day when the content item was viewed, the channel the content item appeared on, and/or any other delineation as may be used to determine a rule. The content item may be retrieved from a server, such as a content server 106, and may have associated user interaction data.

In step 630, the system may collect user interaction data for the content item. The user interaction data may be, for example, the number of each user event that occurs for each point in time over the duration of the content item. The user events may be associated with events associated with user interactions with a content item presented to one or more users. For example, the system may collect the number of users that are fast forwarding a content item at each 2 second interval for the duration of the content item. The user interaction data may be data collected for the content item as it is watched in real time, using delayed collection from remote devices (such information gathered at one or more STBs 113), using digital tracking information (such as web cookies), and/or any other suitable form for collecting user data. For example, a STB may track instances when the channel is changed, when fast forwards occur, when content is paused, when the volume changes, and/or other user interactions. Collected information may be aggregated at a server, such as a content server 106, for later analysis using one or more methods such as those described herein.

User interaction data for only a certain group of users may be used. For example, the system may examine user interaction data for geographic based groups, age based groups, social media based groups, groups based on when the content item is viewed, or any other grouping that may provide useful information. The different groups may be processed separately. Additionally or alternatively, multiple groups may be processed at the same time, and the system may note determined information separately for each group (for example, group A fast-forwards at time X, and group B fast-forwards at time Y). Some groups of users may be better suited to determining advertisement locations than others, so data from some groups may be considered more strongly than data from other groups. For example, younger viewers may tend to switch content randomly, while older viewers may tend to switch content only for advertisements. Content switches from older viewers may be weighted more heavily than content switches from younger viewers, as they are more indicative of scene changes.

In step 635, the system may determine distributions for the different factors to be considered for the rule. The distributions may vary in type and/or calculation based on the factor and its applicable rule. The raw numbers of events over time collected in step 630 may have limited use without context, as an increase in numbers has less meaning if there are more overall users in the data. A distribution may provide a more usable set of data for a computing system. Further, performing the distributions in advance may have the advantage of allowing the distributions to be calculated separately from later distributions and may allow a distribution graph to only need to be created once (with different portions used for different scene changes).

The distribution may be, for example, a derivative distribution. For example, in FIG. 3, content switch events spike sharply at point 315. The system may calculate a derivative of the graph 305 to produce a slope graph of the rate at which users are switching to or away from (e.g., tuning in or out of) a content item at different points in time. This graph may further be smoothed to account for variances in the data. For example, a window may be selected for determining the slope values. A larger window (for example, considering the slope every two seconds) may present a more consistent graph than a smaller window (for example, considering the slope every 0.01 seconds), as the smaller window will reflect random variance in the data.

Additionally or alternatively, the distribution may be, for example, a normal (e.g., Gaussian) distribution or any other type of distribution. By calculating the standard deviation of the number of events in a point of time versus the average number of events for any point in time in the content item, the system may determine the statistical significance of the number of events at that point in time. For example, a content item may have a significant variance regarding the number of volume changes that occur per a two second period. By determining the standard deviation of the number of volume changes in each period, the resultant graph may represent instances where the number of volume changes exceeded the random variance at a statistically significant level in order to determine a correlation to the location of an advertisement.

Additionally or alternatively, the distribution may be, for example, a ratio of the instance of a factor in a given window of time compared to the average instance of the factor for the window of time throughout the content item. For example, the system may calculate the ratio of the instance of pauses for every 2 second window of the content item versus the average number of pauses for an average 2 second window of the content item. This may provide a more consistent data set upon which the system may evaluate various rules, as it may account for changes in the number of users or noise in the collected user interaction data.

Any other statistical methods useful for analyzing data may be applied. For example, a ratio may be applied to a derivative distribution in order to create a consistent comparison of the change in the ratio per unit time rather than the change in the total number per unit time. The derivative distribution may be compared against a statistical distribution in order to determine the statistical significance of each rate of change represented by the derivative graph. Thus, the methods described herein may also be implemented using a combination of distributions and/or other types of distributions.

In step 640, the system may determine scene changes for a content item. A system may analyze the content item in order to determine where scene changes appear to have occurred. For example, the system may analyze the visual content of a content item to determine one or more scenes, as described in FIG. 3. The transition between each scene may be considered a scene change. The system may receive data indicating when scene changes occur when it receives the content item, and/or from a separate system. Using scene changes may have the advantage of reducing the number of data points for the system to consider (the system may only apply the rules at scene changes), and may focus the system on points that are more likely to be the beginning or end of advertisements. For example, a sitcom scene of two characters in a bedroom may be distinguished from a subsequent scene of two characters at the grocery store. While the system may not, at this stage, be able to determine if the grocery store scene is an advertisement, by determining that the scene has changed, the system may focus its resources on analyzing the transition between the two scenes to determine if the grocery store scene is an advertisement. This may avoid wasting processing power analyzing interactions in the middle of a scene, where the beginning of an advertisement may be unlikely. Once the scene changes have been determined, the system may proceed with analyzing the first scene change in step 645.

In step 645, the system may determine a content switch value for a scene change. The system may analyze the number of users that are switched to (e.g., tuned in to) a content item at one period in time versus the number at another period of time. If users begin to switch away from the content item (whether they switch away to watch other content, or cease watching content altogether), this may indicate that the content item may be transitioning to advertisements. If users begin to tune back in to program, this may indicate that the content item may be transitioning out of the advertisements and back into the show. The system may determine a value to represent the tune in or content switch events for the scene change.

The system may use a derivative distribution to determine the content switch value for the scene change. A derivative distribution may indicate the rate at which users are switching away from the broadcast during the scene change. A value may be assigned based on the slope of the line using a rule associated with the content item. For example, the value may be 1 for every 2.5% of users who switched away per second. A negative value may correspond to a negative slope. A positive value may thus correspond to switch aways, and a negative value may correspond to tune ins. A time window may be specified for the scene change. For example, the system may analyze a three second window after the scene changes. The system may then determine the value based on an average of the values corresponding to each second of the three second window.

In step 650, the system may determine a fast forward value for the scene change. The system may analyze the number of users that are fast forwarding at the approximate time of the scene change. If users begin fast forwarding, this may indicate that the content item may be transitioning to advertisements. If users cease fast forwarding, this may indicate that the content item may be transitioning out of the advertisements and back to the show. The system may determine a value to represent the fast forward events for the scene change.

The system may use a derivative distribution to determine the fast forward value for the scene change. A derivative distribution may indicate the rate at which users are fast forwarding the broadcast during the scene change. A value may be assigned based on the slope of the line using a rule associated with the content item. For example, the value may be 1 for every 2.5% of users who begin fast forwarding per second. A negative value may correspond to a negative slope. A positive value may thus correspond to beginning fast forwarding, and a negative value may correspond to ceasing fast forwarding. A time window may be specified for the scene change. For example, the system may analyze a three second window after the scene changes. The system may then determine the value based on an average of the values corresponding to each second of the three second window.

In step 655, the system may determine a pause value for the scene change. The system may analyze the number of users who are pausing the content item in order to determine whether the scene change is transitioning to an advertisement. The more that individuals pause the content item, the more it may be indicative that advertisements have begun.

The system may use a statistical distribution to determine the pause value for the scene change. The system may determine the deviation between the pause events that occur in a window after a scene change (such as three to five seconds after the scene change). A positive deviation may indicate that an advertisement has begun. A negative deviation may indicate that an advertisement has ended. The system may then assign a value based on the deviation and a rule associated with the content item. For example, the system may assign the average deviation as the value.

In step 660, the system may determine a volume change value for the scene change. The system may analyze the number of users that are decreasing or increasing their volume at the scene change. If users decrease their volume, this may indicate that the content item may be transitioning to advertisements. If users increase their volume, this may indicate that the content item may be transitioning out of the advertisements and back to the show. The system may determine a value to represent the volume changes for the scene change.

The system may use a statistical distribution to determine the volume change value for the scene change. The system may determine the deviation between the volume changes in a window after a scene change (such as three to five seconds after the scene change). The deviation for volume increases may then be subtracted from the deviation for volume decreases. A resultant positive deviation may indicate that a significant number of volume decreases may have occurred, and that the content item may be transitioning to an advertisement. A resultant negative deviation may indicate that a significant number of volume increases may have occurred, and that the content item may be transitioning to out of an advertisement and back to the show. The system may then assign a value based on the deviation and a rule associated with the content item. For example, the system may assign the resultant deviation as the value.

In step 665, the system may determine if other factors should be considered. For example, the system may determine values based on logos, game clocks, or other such information. For example, the system may determine the location of an advertisement based on an ambient noise level recorded by the STB, as users may only talk to each other during commercial breaks. If no other factors should be considered, the system may proceed to determining the total value at step 675. If another factor should be considered, the system may determine the value for the other factor in step 670. For example, the system may assign a value of 1 when a logo appears three seconds after a scene change, and a value of 0 when it does not. In another example, the system may assign a value of 1 when a game clock appears three seconds after a scene change, and a value of 0 when it does not. After determining the value for the factor, the system may return to step 665 to determine if further factors should be considered.

In step 675, the system may determine a total value for the scene change. The system may use the values determined in steps 645, 650, 655, 660, and/or step 670 to determine the total value based on a rule. For example, the system may apply the rule corresponding to a sitcom as depicted in FIG. 5. The system may apply a weight of 1 to a fast forward value, a weight of 0.8 to a content switch value, a weight of −5 to a logo value, a weight of 0 to a clock value, a weight of 10 to a volume increase, and a weight of 5 to a pause value. The system may then add the weighted values to determine the value for the content item. Any mathematical algorithm may be used to combine the different values in order to determine a total value. For example, an algorithm may exponentially weight more statistically significant values over less statistically significant values.

In step 680, the system may determine whether a threshold value has been met. The system may establish three possibilities based on the threshold value: the scene change may be the beginning of advertisements, may be the end of advertisements, or may not represent either the beginning or end of advertisements (e.g., is neutral). The system may determine which possibility to choose based on comparing the total value versus a threshold. If the total value exceeds the threshold, the scene change may be flagged as the beginning of advertisements in step 685. If the total value is below the negative of the threshold, the scene change may be flagged as the end of a section of advertisements in step 690. If the total value falls between the positive and negative of the threshold, then the scene change may be flagged as neutral in step 693. For example, the system may determine the total value for a sitcom is 65. Using the exemplary rule depicted in FIG. 5, the system may determine that this exceeds the positive of the threshold and flag the scene change as the beginning of an advertisement. In another example, the system may determine the total value of a drama is −57. Using the exemplary rule depicted in FIG. 5, the system may determine that this falls below the negative of the threshold and flag the scene change as the end of advertisements. In another example, the system may determine that the total value for an action program is 34. Using the exemplary rule depicted in FIG. 5, the system may determine that the total value is between the positive and negative of the threshold and flag the scene change as neutral. After flagging the scene change, the system may proceed to determining if there are further scene changes in step 695.

In step 695, the system may determine if there are further scene changes to be considered for the content item. The system may proceed through every scene change for a content item before proceeding to step 698. Additionally or alternatively, only a subset of scene changes may be considered in an iteration of the method. For example, multiple systems may each consider one subset of scene changes for a single content item. If there are further scene changes to be considered, the system may proceed to step 645 for the next scene change. If there are no further scene changes to be considered, the system may proceed to determining the advertisement locations in step 698.

In step 698, the system may determine advertisement locations based on the flagged scene changes. The system may determine a timeline of the content item and identify portions between scene changes flagged as the beginning and end of advertisements as advertisements, and other areas as the show. Post processing may be performed. If two scene changes in a row are flagged as a beginning/end, the system may choose to either ignore one, or choose the stronger of the two as the beginning/end. The system may also know that advertisements have a set duration, such as a 30 second interval, and discard flagged scene changes that do not fall according to that interval. For example, if a scene change at 30 seconds is flagged as the beginning of advertisements, and two scene changes are flagged as the end of advertisements at 90 and 100 seconds, the system may elect the scene change at 90 seconds because it falls on a 30 second interval from the beginning of the advertisements.

An ad insertion platform, which may be implemented as a computing device 200, may predict advertisement opportunities for placing advertisements in linear or time shifted content based on the advertisement locations determined according to the systems and/or methods discussed herein. The ad insertion platform may receive the advertisement locations from a separate system. For example, a system determining advertisement locations may transmit advertisement locations as data to the ad insertion platform. Additionally or alternatively, a system for determining advertisement locations may be integrated into the ad insertion platform. Advertisement placement opportunities may correlate to the advertisement locations determined by the system.

The ad insertion platform may replace one or more advertisements in a content item based on the advertisement's locations for the content item. The ad insertion platform may identify advertisements for replacement based on received advertisement location data. For example, the ad insertion platform may determine that portions of a content item are indicated as being an advertisement in a timeline, such as may be generated in step 698 above. The ad insertion platform may then remove the advertisements at the advertisement locations and/or insert new advertisements. For example, the ad insertion platform may remove all advertisements at the advertisement locations, and insert directed advertisements in their stead. This may have the benefit of shortening video for on-demand streaming, while still presenting directed advertisements appropriate for the streaming platform.

Advertisements may be removed and/or inserted by the ad insertion platform at the advertisement locations based on further data. For example, the ad insertion platform may receive fast forward information (such as from the system discussed above) noting that viewers in a certain demographic frequently fast forwarded through an advertisement. The ad insertion platform may remove the frequently fast forwarded advertisement, and/or insert an alternative advertisement that may be better suited for the demographic. In another example, advertisements for a content item may originally be intended for an original demographic, but may be replaced by the ad insertion platform with advertisements for a younger demographic when the content item is streamed online if the younger demographic is more likely to stream online than the original demographic. In yet another example, a first advertisement targeted at a targeted demographic (such as kids) may be rarely skipped by the targeted demographic. A second advertisement targeted at the first demographic may be frequently skipped. The ad insertion platform may replace the second advertisement with the first advertisement in order to maximize the amount of advertisements that are viewed by the targeted demographic.

User content switch commands from a wide audience may be used to identify commercial breaks or scene changes within a duration of a content asset. A content switch may be, for example, a channel change, different content selection, or tune out. A content asset may be, for example, a situational comedy, action program, comedy program, drama program, a sporting event, or other types of content. The commercial breaks may include, for example, commercial break start times and/or commercial break end times. A user watching a content asset (e.g., the Tonight Show) may seek to watch certain parts of the content asset and avoid watching other parts. For example, the user may enjoy watching interviews or musical interludes of the Tonight Show, but may seek to avoid watching commercial breaks or opening monologues of the Tonight Show. If the content asset reaches a portion that the user is not interested in, the user may switch away from the content asset. A user device may receive the content switch command from the user, and transmit the content switch command to a server (e.g., a server at the local office 103). The server may collect the content switch commands from the user and other users watching the content asset. Based on the collected content switch commands, the server may generate content switch data for the content asset. Based on the content switch data, the server may identify the commercial breaks or scene changes.

Figure 7A:
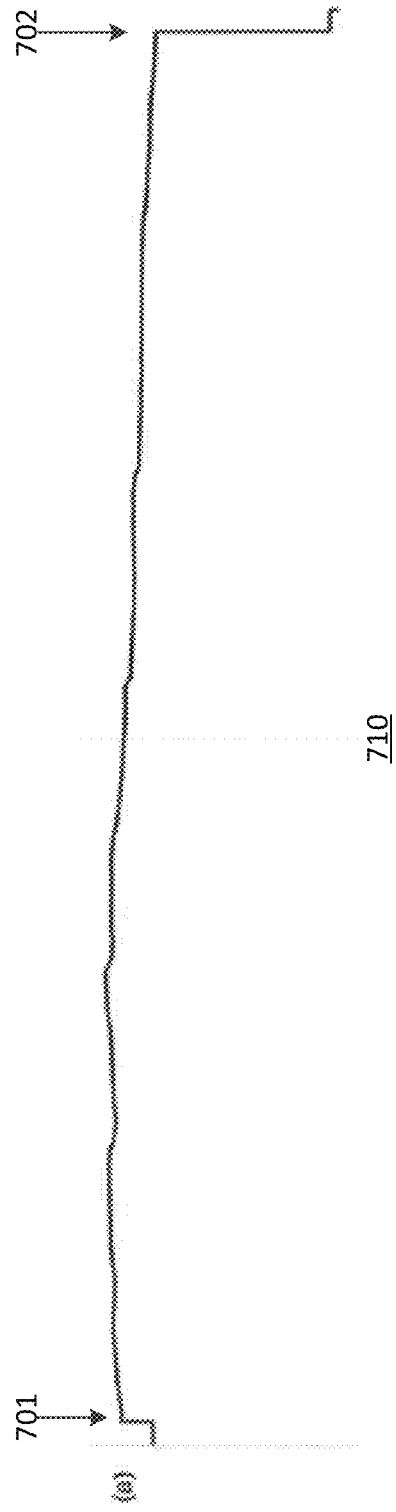

FIGS. 7A-D show examples of user content switch interactions over a duration of a content asset. Referring to FIG. 7A, the graph 710 may show the viewership of a content asset over the duration of the content asset. The server may determine the numbers of users or households that are watching the content asset at each point in the duration of the content asset. The graph 710 may show an initial jump in the viewership at point 701, which may indicate a start time of the content asset. For example, when the Tonight Show begins, users may tune into the Tonight Show, which may cause a jump in viewership. After the initial jump in the viewership at the point 701, the viewership may remain substantially steady throughout the duration of the content asset. At point 702, the graph 710 may show a drop in the viewership, which may indicate an end time of the content asset. For example, users may stop watching the Tonight Show after the Tonight Show ends, which may cause a drop in viewership.

Figure 7B:
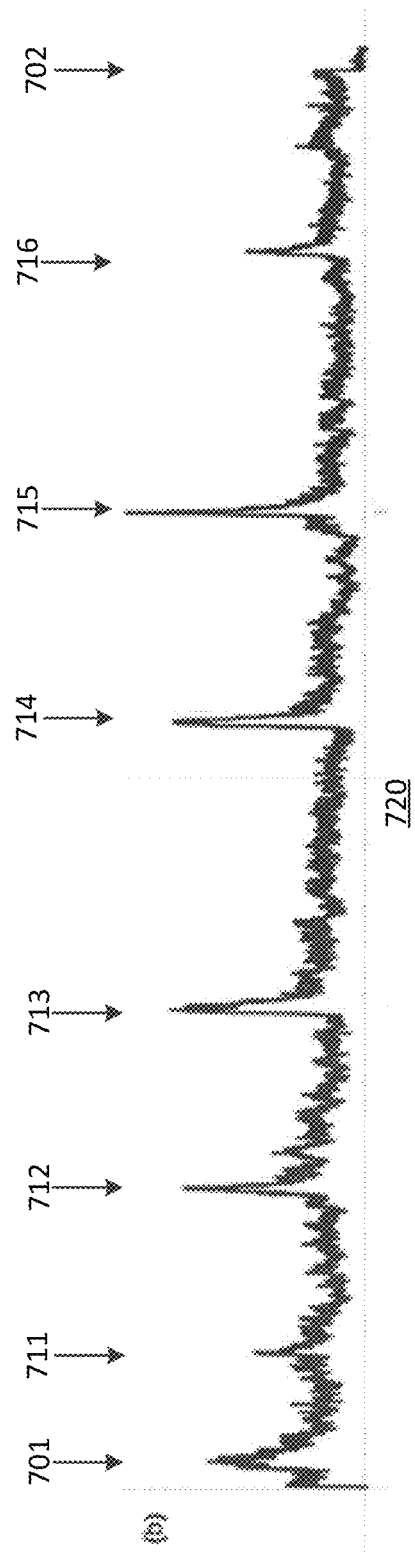

Referring to FIG. 7B, the graph 720 may show the content switch data over the duration of the content asset. Throughout the duration of the content asset, the server may collect the content switch commands from the users, and calculate the number of user content switch commands at each point in the duration of the content asset. The graph 720 shows a peak at point 701, which may indicate the start time of the content asset. For example, at the beginning of the Tonight Show, users watching a previously transmitted content asset, such as a football game, might not be interested in watching the Tonight Show. At the point 701, users not interested in watching the Tonight Show may switch away from the Tonight Show and switch to another content asset. At the same time in the duration of the Tonight Show, the graph 710 may show a jump in the viewership at the point 701 (e.g., users tuning in to watch the Tonight Show), whereas the graph 720 may show a peak in the content switch data at the point 701 (e.g., users switching away from the Tonight Show).

The graph 720 may show other peaks in the content switch data, such as peaks at points 711, 712, 713, 714, 715, 716. The peaks may indicate commercial breaks or scene changes in the duration of the content asset. For example, users might not desire to watch the opening monologue or commercial breaks of the Tonight Show, and may switch away from the Tonight Show to another content asset. The peaks in the graph 720 (e.g., the peaks at the points 711, 712, 713) may indicate times within the duration of the Tonight Show when a peak number of users entered content switch commands. Referring to point 712, after the Tonight Show enters a commercial break, the number of users that want to avoid watching the commercial break and enter content switch commands may continue to increase. More and more users may switch away from the Tonight Show until the content switch data reaches a peak (e.g., the peak at point 712).

After point 712, there may be a decline in the number of users who enter content switch commands. The decline in the number of users who enter content switch commands might not be steady. For example, a random number of users may tune back to the Tonight Show early, and upon seeing that the Tonight Show is still in a commercial break, the users may switch away again, causing a small peak in the content switch data. Due to this randomness, the decline after point 712 might not be a steady decline, but may be erratic by nature (e.g., multiple small peaks following a large peak). When the commercial break ends and the program resumes, those users who tune back to the stream may stay there, at least until the next commercial break.

The peak at the point 711 may be smaller than the peaks at the points 712, 713. This smaller peak may indicate a scene change. For example, some users might not desire to watch the opening monologue of the Tonight Show. The number of users not wanting to watch the opening monologue may be less than the number of users not wanting to watch a commercial break.

Throughout the duration of the content asset, a number of users may switch between content for reasons other than to avoid a commercial break. For example, the user may switch between content because they are channel surfing. Statistically, the number of content switch commands may be fairly steady, such as at a steady state value, during portions of the content asset when there are no commercial breaks or scene changes. Detecting if the content switch data returns from a peak back to the steady state value may give an indication whether the content asset returns from the commercial break. However, due to the erratic nature of the content switch commands, it may be difficult to detect this point from the graph 720. Prior to detecting the point when the content switch data reaches the steady state value, the server may filter the content switch data.

Referring to FIG. 7C, the graph 730 may show a filtered version of the graph 720. The server may apply a filter (e.g., a moving average filter) to the graph 720 to generate the graph 730. The moving average filter may be, for example, a succession of averages derived from successive segments of a series of values. A time interval may be selected to determine the moving average. A larger time interval (e.g., determining the average every five seconds) may present a less noisy graph than a smaller time interval (e.g., determining the average every two seconds). By using the filter to reduce noise, accuracy for detecting commercial break start times, commercial break end times, or scene changes may improve.

Regardless of the commercial breaks or scene changes, some users may be channel surfing. Referring to the graph 730, the content switch value may never reach zero. For example, when content for the Tonight Show is being displayed (e.g., when the Tonight Show returns from commercial breaks), the content switch data may stabilize. The content switch data may stabilize when users who are channel surfing are inputting content switch commands and users who are watching the show might not be inputting content switch commands. A commercial break end time may be detected by determining when the content switch data reaches a steady state value.

Referring to FIG. 7C, point 712 may indicate commercial breaks or scene changes. But, due to the erratic nature (e.g., multiple smaller peaks following point 712) of users' content switch commands, there may be multiple different times when the number of content switch commands reaches the steady state value. A best fit curve may be used after a peak value to reduce the number of times that the number of content switch commands reaches the steady state value.

Referring to FIG. 7D, the graph 740 may show fitting a best fit curve to determine when the content asset resumes from a commercial break. For example, the graph 740 may represent using the data from the graph 730 to fit a best fit curve after each peak value (e.g., the peaks at the points 701, 711, 712, 713, 714, 715, 716). The server may retrieve the content switch data (e.g., data from the graphs 720 or 730) for each peak value, and may calculate a best fit curve after each peak value.

To retrieve the content switch data for each peak value, the server may first split the content switch data from the graph 730 into windows of content switch data. The windows may be used to detect commercial break start times and commercial break end times. The server may determine a window size of content switch data. The window size may be, for example, a time interval that is expected to contain one commercial break. The window size may be fixed or may vary depending on the content asset. For example, some content assets may include more commercial breaks than other content assets. The window size may be smaller for shows that include more commercial breaks.

Referring to FIG. 7B, there may be multiple different peak values. The server may determine a window size for portions of content switch data to determine one peak value from each of the windows of content switch data. Each window may include a portion of content switch data, such as a portion of the content switch data shown in the graph 730. FIG. 8A shows an example window of content switch data. For example, FIG. 8A may show a portion of the content switch data from the graph 730 and corresponding to the point 712. The server may use the content switch data shown in FIG. 8A to calculate a best fit curve for the commercial break corresponding to point 712.

Figure 8B:
FIGS. 8A-B show examples of windows of user content switch interactions.
Figure 8A:

FIG. 8B shows an example best fit curve for the commercial break indicated by the point 712. A decaying exponential function may be, for example, used as the best fit curve. The server may use the content switch data shown in FIG. 8A to model a declining trend using an exponential function, such as $Y=A*\exp(-B*X)+C$. To calculate the best fit curve, the server may calculate A, B, and C in such a way that the difference between the predicted values (e.g., predicted values determined according to the exponential function) and actual values (e.g., data values from FIG. 8A) are minimum. After calculating the constants (A, B, and C) for the decaying exponential function, the server may graph the decaying exponential function.

In the exponential function, Y may be the number of users or households that are switching away from the content asset, and X may be the given points of time in the duration of the content asset. The server may identify the commercial break end time as a point when the decaying exponential function reaches the steady state value. The server may identify the commercial break start time as a point when the decaying exponential function reaches the peak value (e.g., when Y equals the addition of A and C).

Figure 9A:
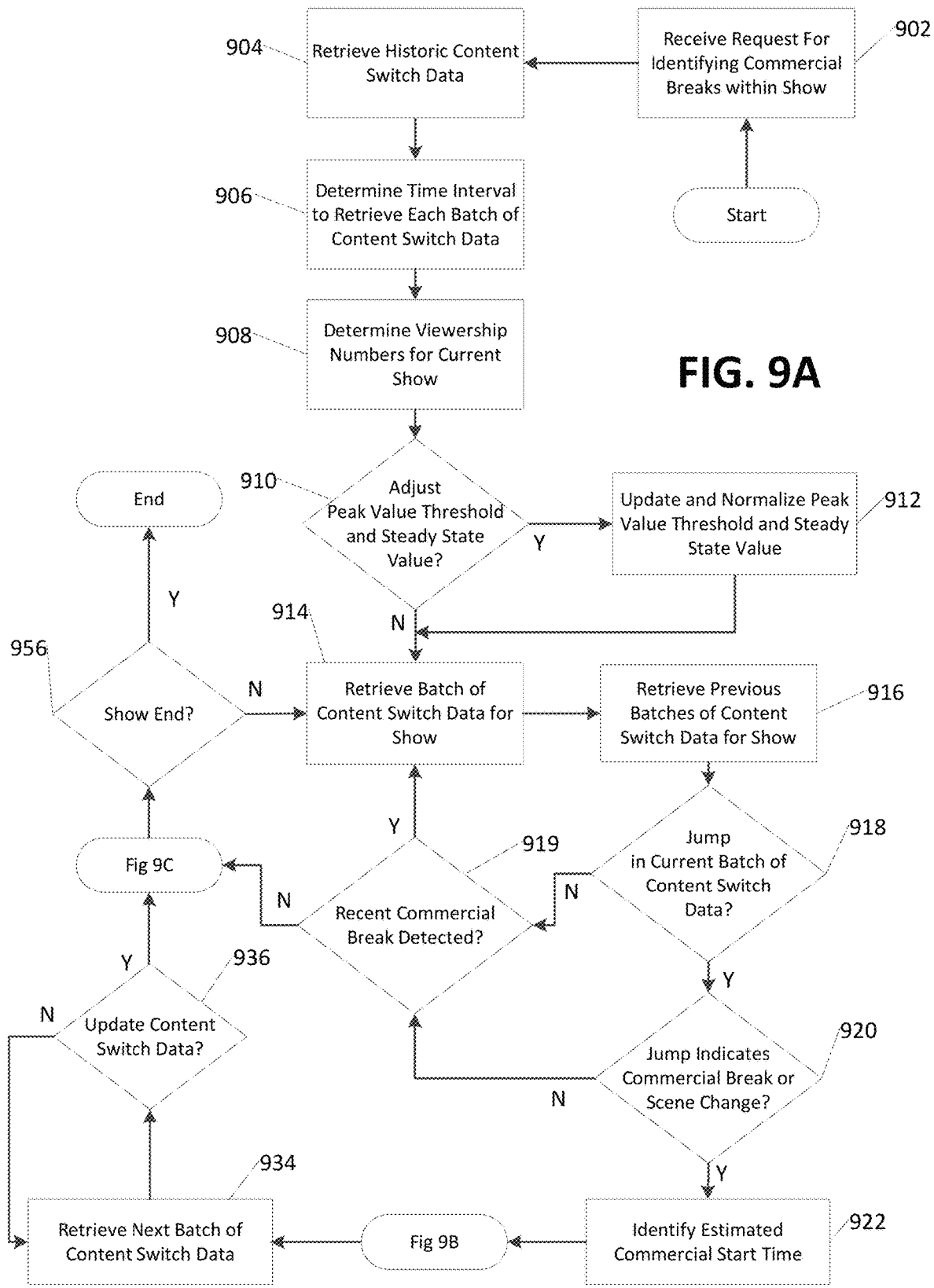
FIGS. 9A-C show an example method for determining times, within the duration of a content asset, when a commercial break or scene change is identified based on analysis of user content switch commands from a wide audience.
Figure 9B:
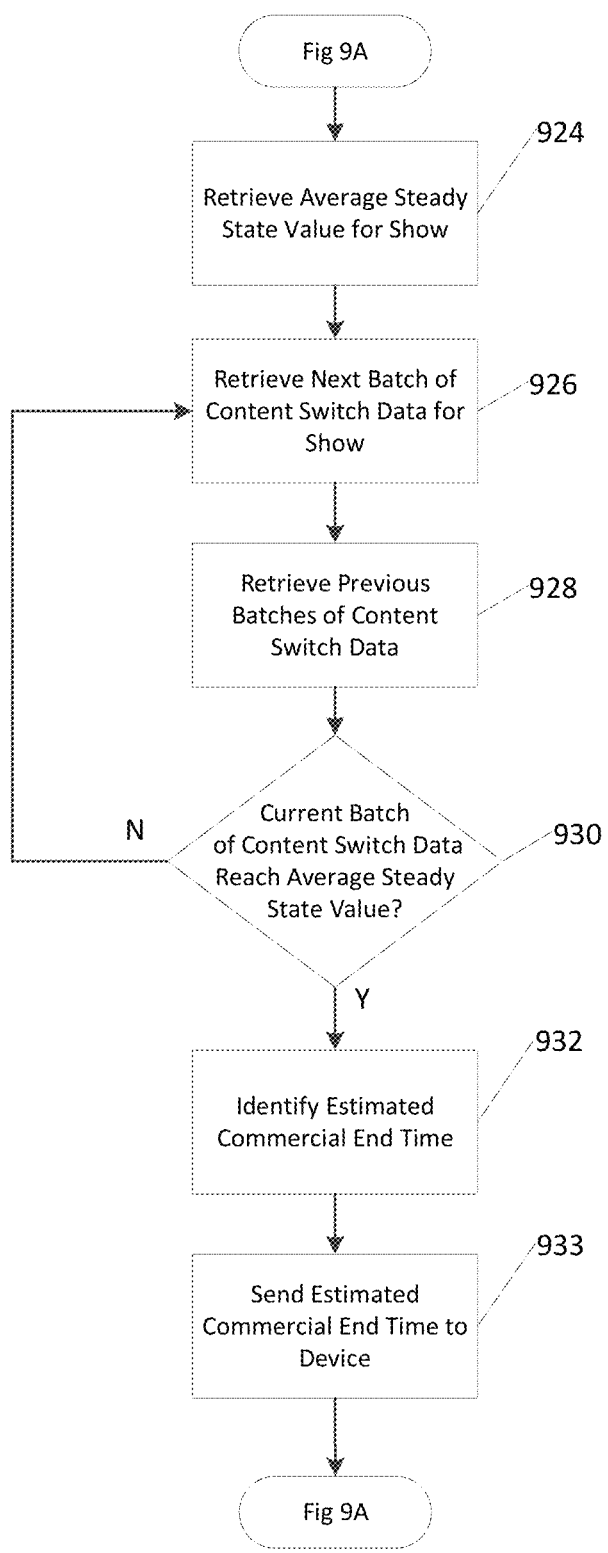
Figure 9C:
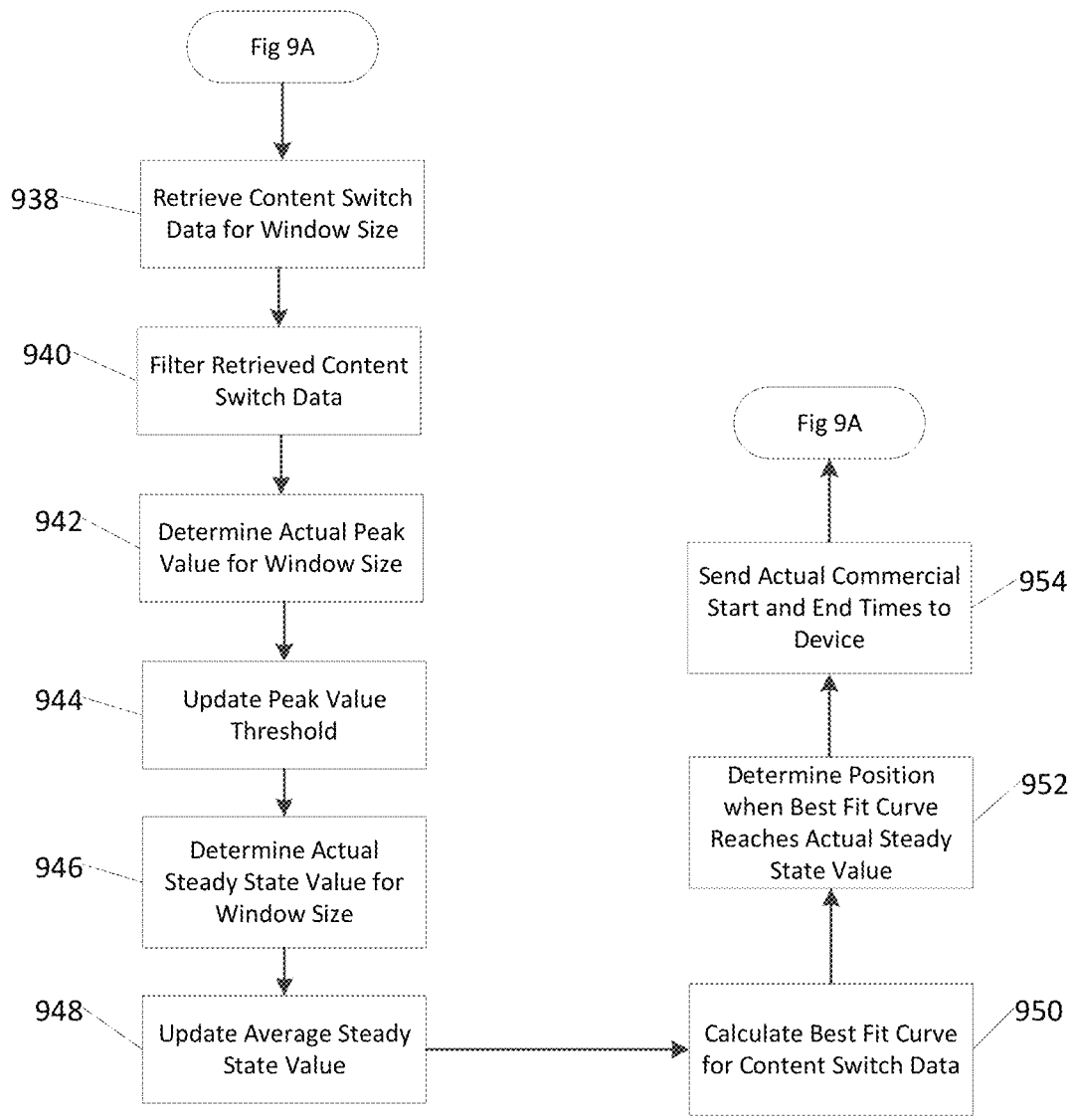

FIGS. 9A-C show an example method for determining times, within the duration of a content asset, when a commercial break or scene change is identified based on analysis of user content switch commands from a wide audience. The commercial breaks may include, for example, commercial break start times and/or commercial break end times. The method may be performed by servers at the local office 103, or other servers that have access to the content switch data. The content switch data may be determined based on the collected user content switch commands. For example, the graphs 710, 720, 730, 740 may show content switch data for an episode of the Tonight Show. To generate the graphs 710, 720, 730, 740, the server at the local office 103 may collect user content switch commands over the duration of the Tonight Show. Based on the graphs 710, 720, 730, 740, the server may identify the commercial breaks or scene changes.

One or more steps of the method may be performed, and the commercial breaks or scene changes may be determined, as a content asset is being transmitted live. The server may collect user content switch commands and identify commercial breaks or scene changes as the show is being transmitted live (e.g., transmitted via a linear transmission). For example, to identify the commercial break end time, the server may calculate a best fit curve using a window of content switch data, such as the window of content switch data shown in FIG. 8A. Referring to FIG. 8A, the window of content switch data may include content switch data corresponding to content switch values before, during, and after the commercial break. Thus, to calculate a best fit curve, the server may require content switch data corresponding to content switch values for after the commercial has ended. Additionally or alternatively, rather than calculating the commercial break start and end times using windows of content switch data, the server may calculate and send estimated commercial break start and end times to the user. Then, if the server has collected enough content switch data (e.g., a window of the content switch data), the server may send an updated actual commercial break start and end time to the user.

Additionally or alternatively, one or more steps of the method may be performed, and the commercial breaks or scene changes may be determined, after the transmission of the content asset. The server may collect user content switch commands and identify commercial breaks or scene changes at some point of time after the transmission of the content asset. The server may collect the user content switch commands and store the information in a database, and the information may be retrieved later by the server for processing.

The determined commercial breaks or scene changes may be made available to the users for their various use. The determined commercial breaks or scene changes may be sent to the user device, and applied to the content asset, while the content asset is being transmitted live. Additionally or alternatively, the determined commercial breaks or scene changes may be used later for DVR playback. For example, commercial breaks may be removed from the DVR recordings to give the users a better viewing experience. Additionally or alternatively, commercial breaks in the DVR recordings may be replaced with other contents. For example, existing commercial breaks in the DVR recordings may be replaced with new advertisements that may be more appealing to the specific viewers of the DVR recordings.

In step 902, a server at the local office 103 may receive a request for identifying commercial breaks or scene changes within a content asset. For example, a user may be watching a show (e.g., the Tonight Show), which may be transmitted live (e.g., linearly transmitted) to a user device. As the user is watching the show, a commercial break may occur. The user, after seeing the commercial break, may decide to switch away from the Tonight Show and watch another content asset. While watching the other content asset, the user may seek to be alerted when the Tonight Show returns from the commercial break. Thus, the user may input a request on the user device to identify when the show returns from the commercial break. The server may receive the request from the user device and may alert the user when the Tonight Show returns from the commercial break.

Additionally or alternatively, the server at the local office 103 may receive the request for identifying commercial breaks or scene changes after the transmission of the content asset. For example, a user may send a request for identifying commercial breaks or scene changes during DVR playback. And the system may process the content switch data to identify the commercial breaks or scene changes.

In step 904, the server may retrieve historic content switch data. The historic content switch data may include graphs similar to those described in FIGS. 7A-D. For example, the historic content switch data may include content switch data for a previous transmission of the Tonight Show, such as yesterday's or last week's episode of the Tonight Show. Additionally or alternatively, the historic content switch data may include content switch data for the same episode of the content asset but shown at different transmission times, such as an episode transmitted at 8 PM ET on the East Coast and 8 PM PT (11 PM ET) on the West Coast. Additionally or alternatively, the historic content switch data may correspond to a different show (e.g., a show being transmitted immediately before the Tonight Show). Additionally or alternatively, the historic content switch data may be content switch data for a different show of the same genre, such as The Late Show.

The server may retrieve the historic content switch data, including the peak values, the constants for the best fit curve (e.g., A, B, and C values for a decaying exponential function), and/or the steady state values. As mentioned above, the Tonight Show may include multiple commercial breaks or scene changes, which may relate to multiple different peaks (e.g., the points 711, 712). The server may retrieve content switch data for each of the different peaks, including the different peak values, the different constants from the best fit curves, and/or the different steady state values. Additionally or alternatively, the server may retrieve the content switch data for one point, such as the point 712, but not for another point, such as the point 711.

After retrieving the historic content switch data, the server may calculate a peak value threshold. The peak value threshold may identify whether a content switch value indicates commercial breaks or scene changes. For example, when a content switch value reaches the peak value threshold, the server may identify a commercial break start time. The peak value threshold may be calculated from the retrieved peak values. For example, the server may average the peak values from the content switch data for yesterday's episode of the Tonight Show.

Additionally or alternatively, some peak values may indicate commercial break start times, whereas other peak values may indicate scene changes, such as an opening monologue of the Tonight Show. The server might not average all of the peak values to determine the peak value threshold. Instead, the server may calculate the peak value threshold by averaging only the peak values indicating a particular commercial break or scene change.

Additionally or alternatively, as shown in FIG. 7B, the peak values for the commercial breaks or scene changes may vary. For example, the peak value at the point 715 may be greater than the peak value at the point 712. The server may further reduce the peak value threshold by a percentage to identify lower content switch values indicating commercial break start times. For example, the server may reduce the peak value threshold by 30% to capture the lower content switch values indicating commercial break start times. Similar to calculating the peak value threshold, the server may average the retrieved steady state values to determine commercial break end times.

Additionally or alternatively, the server may retrieve the content switch data from many different episodes of the Tonight Show. For example, the server may retrieve the content switch data from all episodes of the Tonight Show within the last week, the last month, or the last year.

Additionally or alternatively, the server may retrieve metadata for an episode of the Tonight Show that the user is currently watching. The metadata for the today's episode of the Tonight Show may include closed captioning information and/or a number of commercial breaks within the duration of the Tonight Show. The closed captioning information may include a transcript of the audio for the Tonight Show in text form.

In step 906, the server may determine a time interval to retrieve each batch of content switch data. The server may collect content switch data for the current show being watched by the user as the show is being transmitted live. For example, the user may be watching a live transmission of the Tonight Show. After reaching a commercial break, the user may input a content switch command and watch a different show. The server may collect the content switch commands from the user along with content switch commands from a plurality of other users.

The server may average batches of content switch data as they are being collected. The server may determine a time interval. The time interval may be two seconds, and every two seconds the server may retrieve a batch of content switch data corresponding to the previous two seconds.

Additionally or alternatively, the number of content switch commands received by the server may cause the server to have difficulty calculating commercial breaks or scene changes. For example, referring to FIG. 7B, the number of content switch commands received per second may make the graph 720 noisy and erratic. After retrieving a batch of content switch data, the server may use a filter, such as a moving average filter, to filter out redundant content switch data. For example, after retrieving a batch of content switch data (e.g., the previous two seconds of content switch data), the server may average the batch of content switch data to generate one data point for the batch of content switch data.

Using a larger time interval (e.g., every five seconds) may present a less noisy graph than a smaller time interval (e.g., every two seconds). However, using too large of a time interval may also cause the server to be inaccurate in calculating commercial break start and end times. For example, if the server uses a ten second time interval, the server may only be able to determine that the commercial break start or end time is within that ten second time interval. For shows with less noisy content switch data, the server may determine a smaller time interval to collect user interaction data. For shows with noisier content switch data, the server may determine a larger time interval.

In step 908, the server may determine the viewership numbers for the current show. For example, FIG. 7A may show viewership data for the current episode of the Tonight Show. The server may populate the graph 710 as the show is occurring live or after the transmission of the show. For example, as described above regarding the point 701 in FIG. 7A, initially, the viewership data may spike as users tune in and begin watching the Tonight Show. After the initial spike in viewership data indicated by the point 701, the viewership data may remain fairly steady throughout the course of the Tonight Show. The server may determine the viewership numbers (e.g., the number of households or users) for the Tonight Show after detecting a spike in the viewership data (e.g., the point 701). In step 908, the server may determine the viewership numbers after the spike in viewership data (e.g., point 701). Additionally or alternatively, the server may continuously collect viewership data throughout the duration of the show, and may populate a graph, such as the graph 710, as the viewership data is being collected.

Additionally or alternatively, the server may remain in step 908 until the viewership data stabilizes. Prior to the viewership data stabilizing, the content switch values for the show may be unreliable to determine commercial breaks or scene changes. As mentioned previously, users may be switching away to a different show for a reason other than detecting a commercial break or scene change. For example, the user may be watching the previously transmitted show and might not be interested in watching the Tonight Show. A peak in the content switch data, such as the point 701 indicated by the graph 720, might not be a commercial break or scene change. Therefore, the server might not determine commercial breaks or scene changes until after point 701 (e.g., when the viewership data stabilizes).

In step 910, the server may determine whether to adjust the peak value threshold and/or the steady state value. For example, in step 904, the server may retrieve the content switch data for a previous episode of the Tonight Show, such as content switch data for yesterday's episode of the Tonight Show. However, the content switch data, including the calculated peak value threshold and the average steady state value, for yesterday's episode of the Tonight Show might not directly correlate with today's episode of the Tonight Show. For example, at the same time as today's episode of the Tonight Show is being transmitted, another content asset, such as the Nationals playoff baseball game, may also be transmitted. As such, the viewership numbers may be lower for today's episode of the Tonight Show versus yesterday's episode of the Tonight Show. The viewership numbers may impact the peak value threshold and/or the average steady state value. For example, if fewer viewers are watching the Tonight Show, fewer viewers may be switching away from the Tonight Show at commercial breaks. Further, since viewers are watching the Nationals playoff baseball game, less viewers may be channel surfing, which may impact the average steady state value.

Thus, the server may compare the viewership numbers between the two episodes and determine whether to adjust the peak value threshold and/or the steady state value based on the difference in viewership numbers. If the server determines to adjust these values, the method may move to step 912. If the viewership numbers are similar between yesterday's episode and today's episode, the method may move to step 914.

Additionally or alternatively, the Tonight Show's viewership numbers may fluctuate from episode to episode and content switch data for an episode of the Tonight Show might not correlate with content switch data for another episode of the Tonight Show. As such, the server may use a peak value threshold and/or an average steady state value from another content asset, such as the show being transmitted immediately before the Tonight Show, as a baseline to estimate commercial break start and end times. The method may move to step 912 and adjust these values accordingly.

In step 912, the server may update and normalize the retrieved content switch data for the show. As mentioned above, the Nationals playoff baseball game may be transmitted at the same time as the Tonight Show. Thus, the viewership numbers for today's episode of the Tonight Show may be lower than yesterday's episode of the Tonight Show. After retrieving the historic content switch data, such as the calculated peak value threshold and/or the average steady state value, the server may compare the viewership numbers for the two episodes and then normalize the content switch data.

Based on the comparison, the server may normalize the peak value threshold and/or the steady state value. For example, since the viewership numbers may be lower for today's episode of the Tonight Show, the server may reduce the peak value threshold based on the difference in viewership numbers. If the viewership numbers for today's episode are reduced by 10% due to the Nationals playoff baseball game, the server may reduce the peak value threshold by 10% as well. Similarly, the server may update and normalize the average steady state value based on the viewership numbers for today's episode of the Tonight Show. For example, if the viewership numbers for today's episode are reduced by 10%, then the server may reduce the average steady state value by 10% as well.

In step 914, the server may retrieve a batch of content switch data for the show. For example, the determined time interval in step 906 may be two seconds. The server may retrieve the previous two seconds of content switch data for the Tonight Show. As mentioned previously, the method 900 may remain in step 908 until the viewership numbers stabilize (e.g., detect point 701). Further, as mentioned previously, the server may also average the content switch commands for the batch of content switch data to generate one data point. For example, the server may aggregate the number of content switch commands received in the past two seconds and then determine an average number of the content switch commands.

In step 916, the server may retrieve one or more previous batches of content switch data. For example, the server may retrieve the previous two batches of content switch data.

In step 918, the server may determine whether there is a jump or spike in the current batch of content switch data. For example, as mentioned previously, when the Tonight Show is showing content, content switch values may remain constant, such as remaining at a steady state value. The steady state value may indicate that only users who are channel surfing are inputting content switch commands. When a commercial break or scene change occurs, such as the beginning of a commercial break or the beginning of an opening monologue, the content switch values may jump or spike. By comparing the current batch of content switch data and the previous batches of content switch data, the server may determine whether the current batch contains a spike in the content switch commands. For example, the server may determine that each of the previous two batches of content switch data (e.g., the average number of content switch commands) has been increasing. Furthermore, the current batch of content switch data has increased as well. Due to the three batches of content switch data (e.g., last six seconds of content switch data) continuously increasing, the server may detect a jump in the content switch data and the method may move to step 920.

Additionally or alternatively, the server may calculate a difference between the batches of content switch data. For example, referring to point 712 on FIG. 7B, the peak value indicated by point 712 is significantly greater than the steady state value. Thus, by calculating a difference between batches of content switch data, the server may determine whether there is a jump in the current batch of content switch data. If so, the method may move to step 920.

Additionally or alternatively, the server may determine there is not a jump or spike in the current batch of content switch data. For example, referring to the point 701 on FIG. 7B, the batches of content switch data after point 701 may indicate a decrease in the number of content switch commands. Thus, the server may determine that there is not a jump or spike in the current batch of content switch data and the method may move to step 919.

In step 919, the server may determine whether any recent commercial breaks have been detected. For example, content switch data for an episode of the Tonight Show might not correlate with content switch data for another episode of the Tonight Show. For example, the peak value threshold from yesterday's episode of the Tonight Show may be significantly greater than the content switch values for today's episode of the Tonight Show. Therefore, throughout the duration of today's episode of the Tonight Show, the server might not identify a commercial break start time. In step 919, the server may determine whether it has detected a commercial break within a period of time, such as within the past ten minutes. For example, based on the run-time of the content asset, the server may determine whether a commercial break has been detected within a period of time, such as ten minutes. If not, the server may move to step 938 and FIG. 9C. As explained in further detail below, in FIG. 9C, the server may update the peak value thresholds and/or the steady state values based on content switch data from today's episode of the Tonight Show. Additionally or alternatively, the server may perform an error checking technique to determine whether the server may have missed a commercial break due to inaccurate peak value thresholds from a previous episode of the Tonight Show. If the server has detected a recent commercial break, the system may move back to step 914.

Figure 10A:
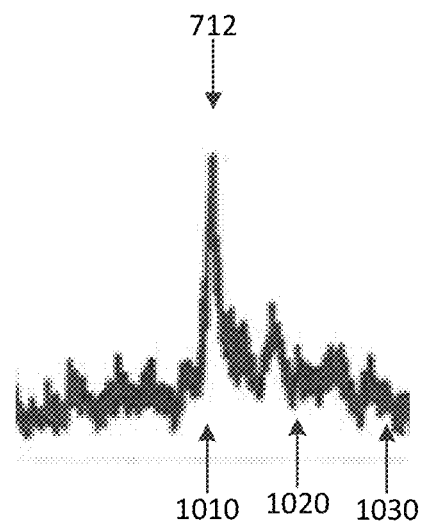
FIGS. 10A-B show examples of portions of content switch data indicating commercial breaks or scene changes.

Returning back to step 914, the server may continuously retrieve batches of content switch data (e.g., the previous two seconds of content switch data) until the server detects a jump or spike in the data. Moving forward in FIG. 7B, the server may detect a jump or spike in the content switch data at the point 712. FIG. 10A shows content switch data indicating a commercial break or scene change. For example, FIG. 10A may show a portion of content switch data from FIG. 7B, such as the content switch data prior to the point 712 and content switch data after the point 712.

Referring to FIG. 10A, the server may continuously retrieve batches of content switch data, but not might detect a jump in content switch data until point 1010. At point 1010, the server may detect a jump or spike in content switch data and move to step 920.

In step 920, the server may determine whether the jump determined in step 918 indicates a commercial break or scene change. As explained above, content switch data may be erratic. Thus, even at steady state, the content switch values may continuously increase over batches of tune data or show a difference between the batches of content switch data.

To account for the erratic nature of content switch commands, the server may compare the value of content switch commands in the current batch of content switch data (e.g., the batch retrieved in the latest iteration of step 914) with the peak value threshold. As mentioned previously, the peak value threshold may be calculated in step 904 and/or updated in step 912. If the number of content switch commands in the current batch of content switch data is above the peak value threshold, the method may move to step 922. If not, the method may return back to step 920.

Additionally or alternatively, scene changes within the content asset, such as an opening monologue or a musical interlude, may be determined using a second peak value threshold. For example, there may be a peak value threshold for the opening monologue of the Tonight Show and another peak value threshold for commercial breaks. As shown by points 711 and 712 of FIG. 7B, the peak value for commercial breaks (e.g., the peak value shown by point 712) may be significantly greater than the peak value for the opening monologue (e.g., the peak value shown by point 711). As such, if the number of content switch commands in the current batch of content switch data is greater than the peak value threshold for commercial breaks, then the server may determine that a commercial break has occurred. However, if the number of content switch commands is less than the peak value threshold for commercial breaks, but greater than the peak value threshold for scene changes, such as an opening monologue, the server may determine that scene change, such as the opening monologue, may have occurred.

In step 922, the server may identify an estimated commercial break start time. For example, the current batch of content switch data may be collected over a time interval, such as a two second time interval. The time interval may correspond to a playback position within the Tonight Show. Thus, the estimated commercial break start time may be a time interval indicated by the current batch of content switch data. The server may also send the estimated commercial break start time to the user device corresponding to the user.

Referring to FIG. 9B, in step 924, the server may retrieve the steady state value for the show. For example, as mentioned in step 904 and/or step 912, the server may retrieve a steady state value, such as an average state value, for the Tonight Show. As described above, the steady state value may be, for example, a value indicating the expected number of content switch commands that are based on normal channel surfing, and not based on viewers switching away due to a commercial break or scene change.

In step 926, the server may retrieve a next batch of content switch data for the show. For example, similar to step 910, the server may retrieve batches of content switch data for the show. However, in step 910, the server used the batches of content switch data to determine a commercial break start time. Now, in step 926, the server may use the next batch of content switch data to determine a commercial break end time. Referring to FIG. 10A, the server may retrieve batches of content switch data immediately following the point 1010.

In step 928, the server may retrieve previous batches of content switch data. For example, the server may retrieve the previous two batches of content switch data. As explained below, the previous batches of content switch data may be used to determine the commercial break end time.

In step 930, the server may determine whether the next batch of content switch data reaches the average steady state value, such as the average steady state value retrieved in step 924. For example, referring to FIG. 10A, immediately after the point 1010, the content switch values may decrease. The server may determine an estimated commercial break end time as a time when the content switch value returns back to the average steady state value. As mentioned previously, the steady state value may indicate that users who are channel surfing may still be inputting content switch commands, but users who are watching the Tonight Show might not be inputting content switch commands.

The server may compare the number of content switch commands in the current batch of content switch data (e.g., the batch retrieved in step 926) with the average steady state value retrieved in step 924. Referring to FIG. 10A, initially, after the point 1010, the content switch values might not reach back to the average steady state value. Thus, the method may return back to step 926 and retrieve more batches of content switch data. Now, at point 1020, the server may determine that the current batch of content switch data has reached the average steady state value, and the method may move to step 932.

Additionally or alternatively, content switch data may be erratic and noisy. For example, as mentioned previously, after the Tonight Show enters a commercial break, a random number of users may have switched back to the Tonight Show too early, and upon seeing that the Tonight Show is still in a commercial break, the users may switch away again. Due to this randomness, the decline after a peak value might not be a steady decline, but may be erratic (e.g., multiple smaller peaks following a large peak) by nature. Therefore, the server may determine whether the number of content switch commands is consistently at a steady state value prior to determining a commercial break end time. For example, if the number of content switch commands has reached the steady state value for the past six seconds, the server may determine that the commercial break for the Tonight show has ended. The server may use the current batch of content switch data and previous batches of content switch data retrieved in step 928 to make this determination.

In step 932, the server may identify the estimated commercial break end time. For example, the server may determine the estimated commercial break end time based on the current batch of content switch data reaching the average steady state value. For example, the current batch of content switch data (e.g., the latest batch of content switch data retrieved in step 926) may be collected over a time interval, such as a two second time interval. Furthermore, the time interval may correspond to playback positions within the Tonight Show. Thus, the estimated commercial break end time may be a time interval indicated by the current batch of content switch data.

In step 934, the server may send the estimated commercial break end time to the user device. For example, referring back to step 902, the user may determine that the Tonight Show is entering a commercial break and input a content switch command. The user may wish to be alerted when the Tonight Show returns from the commercial break. Therefore, the server may send the estimated commercial break end time to a device on the client side.

Figure 11:
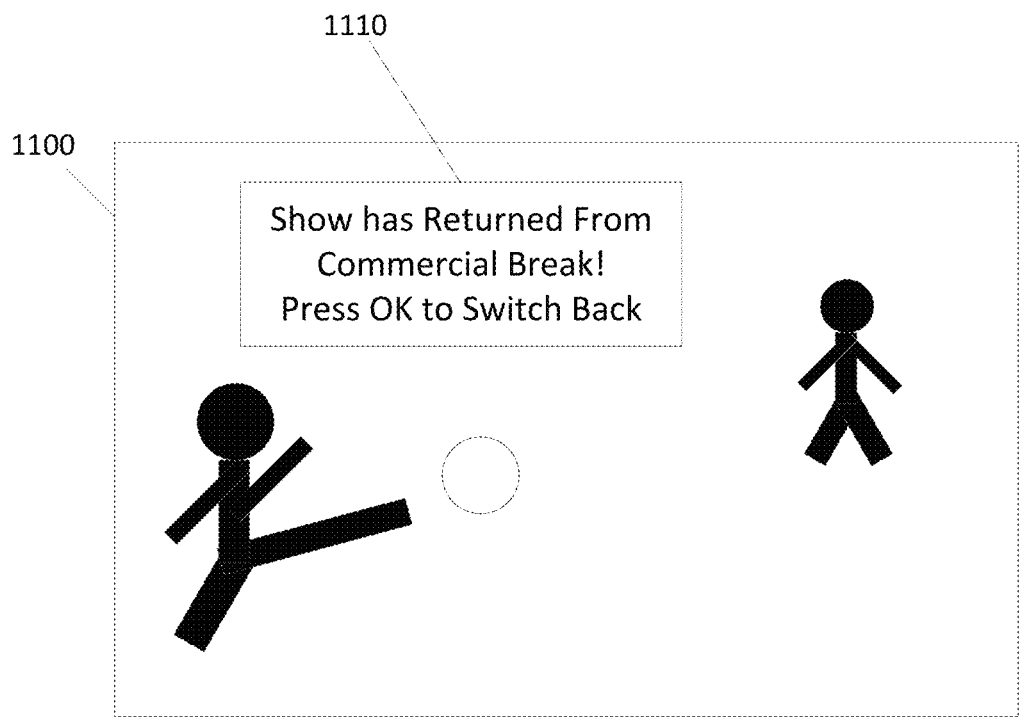
FIG. 11 shows an example display screen indicating a show has returned from a commercial break.

The user device may (e.g. after receiving the estimated commercial break end time) alert the user when the show is about to return from the commercial break. FIG. 11 shows an example display screen indicating a show has returned from a commercial break. For example, after the Tonight Show enters a commercial break, the user may input a content switch command to watch a second content asset, such as a soccer game. Display screen 1100 may show the second content asset. Further, after the server sends the estimated commercial break end time and upon reaching the estimated commercial break end time, the user device may cause display a pop-up notification 1110 indicating the Tonight Show has returned from a commercial break. Additionally or alternatively, the user device may also cause display of a prompt, such as "Press OK to Switch Back." The user device may receive a user input indicating that the user wants to switch back to the Tonight Show, and may cause display of the Tonight Show.

Figure 12:
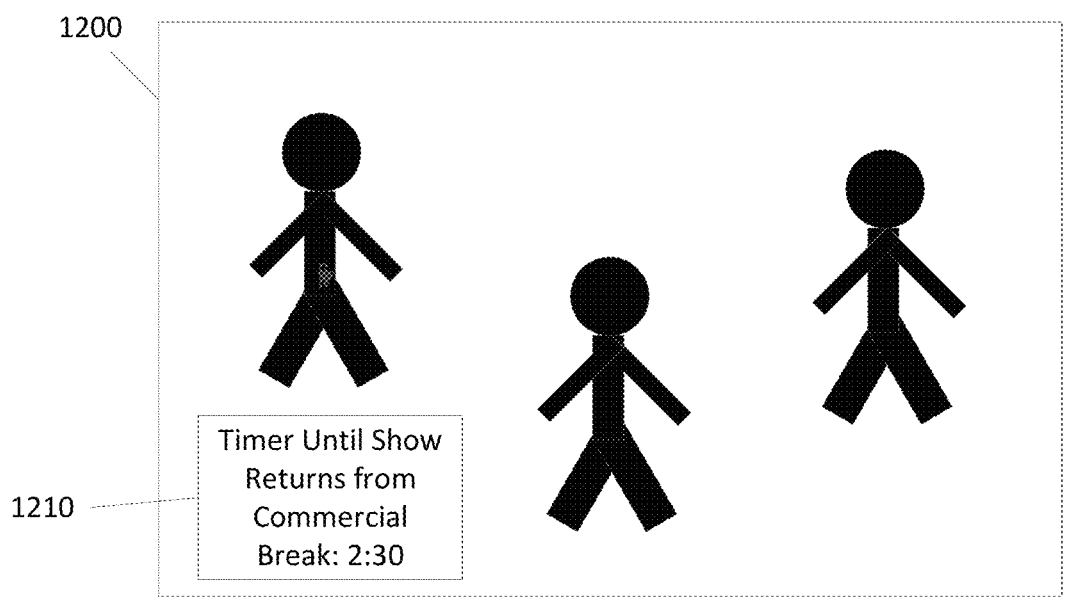
FIG. 12 shows an example display screen indicating a timer for when the show returns from a commercial break.

Additionally or alternatively, the user might not input a content switch command for when the Tonight Show enters a commercial break. Rather, the user may wish to grab a snack and would like to see a timer indicating when the show is returning from a commercial break. FIG. 12 shows an example display screen indicating a timer for when the show returns from a commercial break. For example, display screen 1200 may show an advertisement during the commercial break of the Tonight Show. After receiving the estimated commercial break end time, the user device may cause display of a timer 1210 indicating when the show will return from the commercial break.

Additionally or alternatively, the user device may record the Tonight Show. If the user device receives the estimated commercial break end time, the user device may store the estimated commercial break end time. Therefore, if the user does not want to return to watching the Tonight Show right away, the user may switch to a recording of the Tonight Show at a later time. The recording of the Tonight Show may indicate the estimated commercial break start and end time. For example, the user device may record the Tonight Show in a DVR recording, and the server may send the estimated commercial break start time and end time to the user device to be applied to the DVR recording.

Referring back to FIG. 9A, in step 934, the server may retrieve a next batch of content switch data for the show. For example, similar to step 910 and 926, the server may retrieve batches of content switch data for the show. In step 910, the server may use the batch of content switch data to determine a commercial break start time. Further, in step 926, the server may use the next batch of content switch data to determine a commercial break end time. Now, in step 934, the server may use the next batch of content switch data to calculate a best fit curve. The best fit curve may require a window size of content switch data, which may include content switch data prior to, during, and after the commercial break.

In step 936, the server may determine whether to update the content switch data. For example, the server may determine whether the server has collected a window size of content switch data. As mentioned previously, the server may determine a window size for the show, such as the Tonight Show. The window size may correspond to a time interval, such as 100 seconds, and may be determined based on features corresponding to the content asset. Such features may include the genre of the content asset, the time of day that the content asset is transmitted, the duration of the content asset, the number of commercial breaks within the content asset, and/or the viewership of the content asset. For example, in a mid-day showing of the content asset, the time window may be larger because there may be less advertisements interspersed throughout the content asset. Additionally or alternatively, the window size may be determined based on training data (e.g., past data) corresponding to the content asset, which is described above.

Prior to updating the content switch data, the server may determine whether the time interval for the window size (e.g., 100 second time interval) has been reached. For example, referring to FIG. 10A, initially, after identifying the estimated commercial break end time (e.g., indicated by point 1020), the content switch data may have reached the average steady state value. However, the content switch data might not have reached the time interval for the window size. Thus, the method may return back to step 934 and retrieve the next batch of content switch data (e.g., the next two seconds of content switch data). The server may continuously retrieve batches of content switch data until reaching the time interval for the window size. Point 1010 to point 1030 may indicate a window size of content switch data. If the server determines the server has collected a window size of content switch data (e.g., reached point 1030), the method may move to step 938.

The timer for the window size may begin once the server identifies the estimated commercial break start time (e.g., in step 922 and indicated by point 1010 in FIG. 10A). Additionally or alternatively, the timer for the window size may began prior to the estimated commercial break start time. For example, referring to FIG. 10A, the actual commercial break start time (e.g., indicated by point 712) may be before, after, or at the estimated commercial break start time (e.g., point 1010). Since the actual commercial break start time may be before the estimated commercial break start time, the server may begin the timer prior to the estimated commercial break start time (e.g., before point 1010). For example, the server may reduce the timer for the window size by ten seconds after detecting the estimated commercial break start time.

Referring to FIG. 9C, in step 938, the server may retrieve content switch data for the window size. For example, the server may retrieve content switch data for point 712. Referring to FIG. 10A, the retrieved content switch data may be from point 1010 to point 1030.

In step 940, the server may filter the retrieved content switch data. For example, as described above, the server may filter the content switch data using a moving average filter.

Figure 10B:
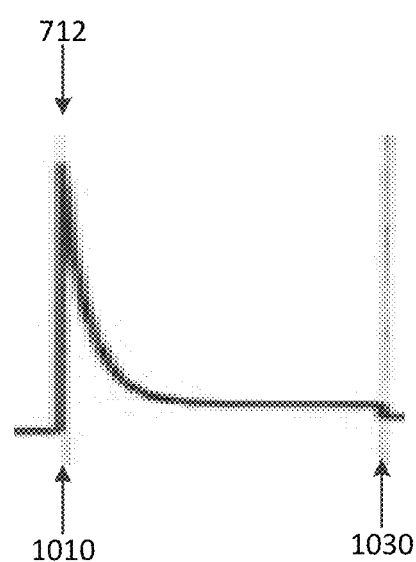

In step 942, the server may determine an actual peak value for the window size. The server may determine the actual peak value as the highest number of users or households that are switching away from the content asset within the window size. Referring to FIG. 10B, the actual peak value may be the value indicated by point 712. The estimated commercial break start time (e.g., point 1010) may be slightly different than the actual peak value (e.g., point 712).

In step 944, the server may update the peak value threshold. For example, after determining the actual peak value in step 942, the server may update the peak value threshold. The peak value threshold, as mentioned in steps 904 and 912, may be previously determined from historic content switch data, such as content switch data from a previous episode of the Tonight Show. However, the peak value threshold for a previous episode of the Tonight Show might not directly correlate with the peak values for today's episode of the Tonight Show. Thus, the server may update the peak value threshold for the previous episode of the Tonight Show.

Additionally or alternatively, the peak value threshold for one episode of the Tonight Show might not correlate with another episode of the Tonight Show. As such, in step 944, after determining the actual peak value for today's episode of the Tonight Show, the server may calculate a new peak value threshold. The server may use the new peak value threshold for identifying estimated commercial break start and end times.

In step 946, the server may determine an actual steady state value for the window size. For example, once a show resumes playing, users may be less likely to switch away from the content item, and the content switch values may be less erratic. Therefore, the server may determine an advertisement end time by determining a time, after a peak value, the number of users or households that are switching away reaches a steady state. The steady state value may be a good representation of when the number of users that are switching away reaches the steady state. The steady state value may be the median value within the window. The median value corresponding to the median number of users or households that are switching away from the content asset. Additionally or alternatively, the steady state value may be an average value or another statistical value corresponding to the content switch data within the window size.

In step 948, the server may update the average steady state values. For example, after determining the steady state value in step 946, the server may update the average steady state value. The average steady state value, as mentioned in steps 904 and 912, may be previously determined from historic content switch data, such as content switch data from a previous episode of the Tonight Show. However, the average steady state value for a previous episode of the Tonight Show might not directly correlate with a steady state value for today's episode of the Tonight Show. Thus, the server may update the steady state values for the previous episode of the Tonight Show.

Additionally or alternatively, the steady state values for one episode of the Tonight Show might not correlate with another episode of the Tonight Show. As such, in step 948, after determining the actual steady state value for today's episode of the Tonight Show, the server may use the actual steady state value for identifying estimated commercial break start and end times.

In step 950, the server may calculate a best fit curve for the content switch data. The server may use a decaying exponential function (e.g. $Y=A*\exp(-B*X)+C$) as a best fit curve. The server may calculate A, B, and C values of the decaying exponential function in a way that the difference between the predicted values and actual values is minimum for the window. In the exponential function, y may be the number of users or households that are switching away from a content asset, and x may be the given points in time. After calculating the best fit curves, the server may create a graph, such as the graph shown in FIG. 10B, displaying the best fit curve after the peak value for point 712.

In step 952, a server may determine a time when the best fit curve data reaches the actual state value calculated in step 946. For example, the server may determine a data point from the best fit curve data where the number of users switching away from the content asset equals the actual steady state value (e.g. determined in step 946). After determining the data point, the server may determine a time associated with the data point. The time for the data point may be the actual commercial break end time.

In step 954, the server may send the actual commercial break start and end times to the user device. For example, referring back to step 902, the user may determine that the Tonight Show is entering a commercial break and input a content switch command. The user may wish to be alerted when the Tonight Show returns from the commercial break. In step 932, the server may send an estimated commercial break start and end time to the device. However, the estimated commercial break start and end time may be different from the actual commercial break start and end time. Therefore, the server may send an updated, actual commercial break start and end time to the user device.

As mentioned previously, the user device may record the Tonight Show. If the device receives the actual commercial break end time, the device may update the stored estimated commercial break start and end time with the actual commercial break start and end time. Therefore, if the user does not want to return to watching the Tonight Show right away, the user may switch to a recording of the Tonight Show at a later time. The recording of the Tonight Show may indicate the actual commercial break start and end time.

Referring back to FIG. 9A, in step 956, the server may determine whether the show has ended. For example, referring back to FIG. 7A, at point 702, the viewership numbers may drop indicating that the Tonight Show has ended. After determining the drop in viewership numbers, the method may end. However, if the server does not determine that the viewership numbers has dropped, the server may move back to step 914.

Returning back to step 914, the server may retrieve another batch of content switch data for the show. Then, as explained above, the server may use this batch of content switch data to determine commercial break start times. However, since the server has updated the peak value threshold in step 944, the server may use the new updated peak value threshold to determine whether the batch of content switch data indicates a commercial break or scene change.

In step 924, the server may retrieve the steady state value for the show. Now, the server may use the updated steady state value in step 948 to determine an estimated commercial break end time. The method may continuously calculate estimated and actual commercial break start and end times and update the peak value thresholds and steady state values until reaching the end of the Tonight Show. Then, the server may store the content switch data as historic content switch data, and may use this data in an upcoming episode of the Tonight Show.

Additionally or alternatively, various other methods as described above (e.g., determining scene changes in step 640, determining commercial breaks or scene changes based on fast forward and pause interactions in steps 650, 655, volume changes in step 660, and visual content of a stream in step 665) may be used with content switch data to determine the actual advertisement start time and actual advertisement end time. Using the content switch method to provide a time interval first may be beneficial since less frames from the show needs to be analyzed. A server may determine a time interval where the actual commercial break start time is likely located based on the peak value. For example, the server may determine a time interval (e.g., 3 seconds before and after the peak value) where the actual advertisement start time is likely located. After determining the time interval, other methods (e.g., determining scene changes in step 640, determining commercial breaks or scene changes based on fast forward and pause interactions in steps 650, 655, volume change in step 660, the visual content of a stream in step 665) may be used within the time interval to determine the commercial break start time. Thus, the time interval may determine a subset of the stream to analyze the visual content of the stream. Further, the server may use the same method to determine the location of the actual advertisement end time.

Additionally or alternatively, the various methods for determining commercial breaks or scene changes may be used in combination and may be ordered in terms of their complexity or computational cost. For example, the method for determining commercial breaks or scene changes based on content switch data as described in connection with FIGS. 9A-C may be conducted first to make an initial determination of the commercial breaks or scene changes. The other methods (e.g., determining scene changes in step 640, determining commercial breaks or scene changes based on fast forward and pause interactions in steps 650, 655, volume changes in step 660, and visual content of a stream in step 665) may be conducted as additional analysis to produce a revised determination of the commercial breaks or scene changes to be used for DVR playback.

The method for determining commercial breaks or scene changes based on content switch data as described in connection with FIGS. 9A-C may be conducted as a quality assurance standard for the other methods described above. For example, one or more steps of the method as described in connection with FIG. 6 (e.g., determining scene changes in step 640, determining commercial breaks or scene changes based on volume changes in step 660, or visual content of a stream in step 665) may be conducted first to determine the commercial breaks or scene changes. The method as described in connection with FIGS. 9A-C may be conducted later to determine again the commercial breaks or scene changes. If the commercial breaks or scene changes as determined at the first time are consistent with the commercial breaks or scene changes as determined at the second time, then it is assured that the first determination was likely accurate. If there is inconsistency, manual determination (made by a natural person) may be conducted, the rules or parameters used by the methods may be adjusted, or the methods may be conducted again by servers. Additionally or alternatively, the one or more steps of the method as described in connection with FIG. 6 (e.g., determining commercial breaks or scene changes based on fast forward and pause interactions in steps 650, 655) may also be used as quality assurance standards for the other methods described above.

The steps and/or other features recited herein may be implemented through any number of computer readable media that are able to store computer readable instructions. Examples of computer readable media that may be used include RAM, ROM, Electrically Erasable Programmable Read-Only Memory (EEPROM), flash memory or other memory technology, CD-ROM, DVD, other optical disk storage, magnetic cassettes, magnetic tape, magnetic storage, and the like.

Additionally or alternatively, the steps and/or other features recited herein may be implemented through one or more Integrated Circuits (ICs). An IC may be, for example, a microprocessor that accesses programming instructions or other data stored in a ROM. A ROM may store program instructions that cause an IC to perform operations according to one or more of the methods described herein. One or more of the steps and/or other features described herein may be hardwired into an IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Although examples have been described herein, there are numerous variations and permutations of the above-described apparatuses, systems, and methods that are contained within the spirit and scope of the disclosure. One or more of the features described herein may be combined with any or all of the other features described herein, and/or with other features. The various features described above are merely non-limiting examples and may be rearranged, combined, subdivided, omitted, and/or altered in any desired manner. Various alterations, modifications, and improvements may occur to those skilled in art in view of the description and accompanying drawings. Such alterations, modifications, and improvements are intended to be part of this description, though not expressly stated herein, and are intended to be within the spirit and scope of the disclosure. Accordingly, the foregoing description and accompanying drawings are by way of example only, and not limiting.

The invention claimed is:

1. A method comprising:
   determining, by a computing device and based on presentation change data received within a threshold time during output of a first content asset, a start boundary of a commercial portion;
   determining, based on a first quantity of current viewers of the first content asset during the threshold time and a second quantity of viewers of a second content asset that is associated with the first content asset, an expected quantity of user commands to be received during a window of time following the start boundary of the commercial portion;
   determining, based on comparing the expected quantity of user commands with a quantity of user commands received during the window, an estimated end time of the commercial portion; and
   sending, to one or more user devices and based on the estimated end time of the commercial portion, information indicating the estimated end time of the commercial portion.

2. The method of claim 1, further comprising:
   receiving, from the one or more user devices, a request for the estimated end time of the commercial portion, wherein the sending is based on the request.

3. The method of claim 1, wherein the determining the expected quantity of user commands comprises determining a curve corresponding to the expected quantity of user commands to be received during the window of time following the start boundary of the commercial portion, and
   wherein the estimated end time of the commercial portion corresponds to a time in the first content asset corresponding to a point on the curve satisfying a threshold.

4. The method of claim 1, further comprising:
   determining the presentation change data based on a maximum quantity of users that, within a period of time, entered channel change commands to switch away from the first content asset.

5. The method of claim 1, further comprising:
   filtering, using a moving average filter, the presentation change data to generate filtered presentation change data, wherein the determining the estimated end time of the commercial portion is further based on the filtered presentation change data.

6. The method of claim 1, wherein a size of the window of time is based on a quantity of commercial portions included in the first content asset.

7. The method of claim 1, wherein the estimated end time of the commercial portion is determined further based on presentation change data collected during a live presentation of the first content asset, and
   wherein the sending further comprises sending, based on determining that the one or more user devices is outputting an on-demand presentation of the first content asset, the information indicating the estimated end time of the commercial portion.

8. The method of claim 1, further comprising:
   using a decaying exponential function to determine the expected quantity of user commands to be received during the window of time following the start boundary of the commercial portion,
   wherein the determining the estimated end time of the commercial portion is further based on the decaying exponential function intersecting a steady state value.

9. An apparatus comprising:
   one or more processors; and
   memory storing instructions that, when executed by the one or more processors, cause the apparatus to:
      determine, based on presentation change data received within a threshold time during output of a first content asset, a start boundary of a commercial portion;
      determine, based on a first quantity of current viewers of the first content asset during the threshold time and a second quantity of viewers of a second content asset that is associated with the first content asset, an expected quantity of user commands to be received during a window of time following the start boundary of the commercial portion;
      determine, based on comparing the expected quantity of user commands with a quantity of user commands received during the window, an estimated end time of the commercial break; and
      send, to one or more user devices and based on the estimated end time of the commercial portion, information indicating the estimated end time of the commercial portion.

10. The apparatus of claim 9, wherein the instructions, when executed by the one or more processors, cause the apparatus to:
    receive, from the one or more user devices, a request for the estimated end time of the commercial portion; and
    send the information based on the request.

11. The apparatus of claim 9, wherein the instructions, when executed by the one or more processors, cause the apparatus to:
    determine the expected quantity of user commands further based on determining a curve corresponding to the expected quantity of user commands to be received during the window of time following the start boundary of the commercial portion, wherein the estimated end time of the commercial portion corresponds to a time in the first content asset corresponding to a point on the curve satisfying a threshold.

12. The apparatus of claim 9, wherein the instructions, when executed by the one or more processors, cause the apparatus to:
determine the presentation change data based on a maximum quantity of users that, within a period of time, entered channel change commands to switch away from the first content asset.

13. The apparatus of claim 9, wherein the instructions, when executed by the one or more processors, cause the apparatus to:
filter, using a moving average filter, the presentation change data to generate filtered presentation change data; and
determine the estimated end time of the commercial portion further based on the filtered presentation change data.

14. The apparatus of claim 9, wherein a size of the window of time is based on a quantity of commercial portions included in the first content asset.

15. The apparatus of claim 9, wherein the estimated end time of the commercial portion is determined further based on presentation change data collected during a live presentation of the first content asset, and
wherein the instructions, when executed by the one or more processors, cause the apparatus to send, based on determining that the one or more user devices is outputting an on-demand presentation of the first content asset, the information indicating the estimated end time of the commercial portion.

16. The apparatus of claim 9, wherein the instructions, when executed by the one or more processors, cause the apparatus to:
use a decaying exponential function to determine the expected quantity of user commands to be received during the window of time following the start boundary of the commercial portion, and
determine the estimated end time of the commercial portion further based on the decaying exponential function intersecting a steady state value.

17. A non-transitory computer-readable medium storing instructions that, when executed, configure a computing device to:
determine, based on presentation change data received within a threshold time during output of a first content asset, a start boundary of a commercial portion;
determine, based on a first quantity of current viewers of the first content asset during the threshold time and a second quantity of viewers of a second content asset that is associated with the first content asset, an expected quantity of user commands to be received during a window of time following the start boundary of the commercial portion;
determine, based on comparing the expected quantity of user commands with a quantity of user commands received during the window, an estimated end time of the commercial break; and
send, to one or more user devices and based on the estimated end time of the commercial portion, information indicating the estimated end time of the commercial portion.

18. The non-transitory computer-readable medium of claim 17, wherein the instructions, when executed, configure the computing device to:
receive, from the one or more user devices, a request for the estimated end time of the commercial portion, wherein the sending is based on the request.

19. The non-transitory computer-readable medium of claim 17, wherein the instructions, when executed, configure the computing device to:
determine the expected quantity of user commands by determining a curve corresponding to the expected quantity of user commands to be received during the window of time following the start boundary of the commercial portion,
wherein the estimated end time of the commercial portion corresponds to a time in the first content asset corresponding to a point on the curve satisfying a threshold.

20. The non-transitory computer-readable medium of claim 17, wherein the instructions, when executed, configure the computing device to:
determine the presentation change data based on a maximum quantity of users that, within a period of time, entered channel change commands to switch away from the first content asset.

21. The non-transitory computer-readable medium of claim 17, wherein the instructions, when executed, configure the computing device to:
filter, using a moving average filter, the presentation change data to generate filtered presentation change data; and
determine the estimated end time of the commercial portion further based on the filtered presentation change data.

22. The non-transitory computer-readable medium of claim 17, wherein a size of the window of time is based on a quantity of commercial portions included in the first content asset.

23. The non-transitory computer-readable medium of claim 17, wherein the estimated end time of the commercial portion is determined further based on presentation change data collected during a live presentation of the first content asset, and
wherein the instructions, when executed, configure the computing device to send, based on determining that the one or more user devices is outputting an on-demand presentation of the first content asset, the information indicating the estimated end time of the commercial portion.

24. The non-transitory computer-readable medium of claim 17, wherein the instructions, when executed, configure the computing device to:
use a decaying exponential function to determine the expected quantity of user commands to be received during the window of time following the start boundary of the commercial portion; and
determine the estimated end time of the commercial portion further based on the decaying exponential function intersecting a steady state value.

25. A system comprising:
a server; and
a user device;
wherein the user device is configured to:
send first presentation change data indicating a user command to change presentation of a first content asset; and
wherein the server is configured to:
determine, based on presentation change data received within a threshold time during output of the first content asset, a start boundary of a commercial portion;

determine, based on a first quantity of current viewers of the first content asset during the threshold time and a second quantity of viewers of a second content asset that is associated with the first content asset, an expected quantity of user commands to be received during a window of time following the start boundary of the commercial portion;

determine, based on comparing the expected quantity of user commands with a quantity of user commands received during the window, an estimated end time of the commercial break; and send, to one or more user devices and based on the estimated end time of the commercial portion, information indicating the estimated end time of the commercial portion.

26. The system of claim 25,
wherein the user device is configured to send a request for the estimated end time of the commercial portion; and
wherein the server is configured to send the information based on the request.

27. The system of claim 25, wherein the server is further configured to:
determine the expected quantity of user commands further based on determining a curve corresponding to the expected quantity of user commands to be received during the window of time following the start boundary of the commercial portion,
wherein the estimated end time of the commercial portion corresponds to a time in the first content asset corresponding to a point on the curve satisfying a threshold.

28. The system of claim 25, wherein the server is further configured to:
determine the presentation change data based on a maximum quantity of users that, within a period of time, entered channel change commands to switch away from the first content asset.

29. The system of claim 25, wherein the server is further configured to:
filter, using a moving average filter, the presentation change data to generate filtered presentation change data; and
determine the estimated end time of the commercial portion further based on the filtered presentation change data.

30. The system of claim 25, wherein a size of the window of time is based on a quantity of commercial portions included in the first content asset.

31. The system of claim 25, wherein the estimated end time of the commercial portion is determined further based on presentation change data collected during a live presentation of the first content asset, and
wherein the server is further configured to send, based on determining that the one or more user devices is outputting an on-demand presentation of the first content asset, the information indicating the estimated end time of the commercial portion.

32. The system of claim 25, wherein the server is further configured to:
use a decaying exponential function to determine the expected quantity of user commands to be received during the window of time following the start boundary of the commercial portion; and
determine the estimated end time of the commercial portion further based on the decaying exponential function intersecting a steady state value.

33. The method of claim 1, wherein the determining the expected quantity of user commands to be received during the window of time following the start boundary of the commercial portion is further based on a genre of the first content asset.

34. The method of claim 1, wherein the determining the expected quantity of user commands is further based on comparing the first quantity of current viewers of the first content asset during the threshold time to the second quantity of viewers of the second content asset that is associated with the first content asset.

* * * * *